US012730849B2

(12) United States Patent
Ho et al.

(10) Patent No.: US 12,730,849 B2
(45) Date of Patent: Sep. 8, 2026

(54) AUGMENTED SEARCH ENGINE

(71) Applicant: Perplexity AI, Inc., San Francisco, CA (US)

(72) Inventors: Johnny Ho, New York, NY (US); Kevin Hu, Santa Clara, CA (US); Nick Jalbert, Berkeley, CA (US); Henry Modisett, Vancouver (CA); Aravind Srinivas, San Francisco, CA (US); Nikhil Thota, San Francisco, CA (US); Alexandr Yarats, Minneapolis, MN (US); Denis Yarats, Minneapolis, MN (US)

(73) Assignee: Perplexity AI, Inc., San Francisco, CA (US)

( * ) Notice: Subject to any disclaimer, the term of this patent is extended or adjusted under 35 U.S.C. 154(b) by 0 days.

(21) Appl. No.: 18/604,852

(22) Filed: Mar. 14, 2024

(65) Prior Publication Data

US 2025/0291863 A1 Sep. 18, 2025

(51) Int. Cl.

| | |
|---|---|
| ***G06F 16/00*** | (2019.01) |
| ***G06F 16/242*** | (2019.01) |
| ***G06F 16/9535*** | (2019.01) |
| ***G06F 16/9538*** | (2019.01) |

(52) U.S. Cl.
CPC ...... *G06F 16/9535* (2019.01); *G06F 16/2428* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 2003/0217052 A1 | 11/2003 | Rubenczyk et al. | |
| 2024/0289365 A1* | 8/2024 | Beauchamp | G06F 16/3329 |
| 2025/0005050 A1* | 1/2025 | Krishnan | G06F 16/338 |
| 2025/0103746 A1* | 3/2025 | Gharibi | G06F 21/6227 |
| 2025/0191082 A1* | 6/2025 | Kumar | G06Q 30/0201 |

OTHER PUBLICATIONS

International Search Report and Written Opinion for PCT/US2025/020071 (ISA/EP) mailed Jun. 5, 2025 (13 pages).
Gao et al., "Retrieval—Augmented Generation for Large Language Models: A Survey," [retrieved from Internet Jan. 5, 2024] https://arXiv.org/pdf/2312.10997v4 (26 pages).

* cited by examiner

*Primary Examiner* — Bai D Vu
(74) *Attorney, Agent, or Firm* — Alston & Bird LLP

(57) ABSTRACT

An augmented search engine is provided. The augmented search engine receives an initial query for a search from a user. The augmented search engine determines a next search phase using a search state database. When the next search phase includes requesting additional user input, the augmented search engine generates a user prompt using the initial query, displays this prompt to the user, and stores the prompt in the search state database. Upon receiving user input in response to the prompt, the augmented search engine generates a search query using the initial query, the user prompt, and the user input and determines search results by querying search indexes with the search query and stores these results in the search state database. The augmented search engine generates a search summary using the initial query, the user prompt, the user input, and the search results, and displays this summary to the user.

17 Claims, 11 Drawing Sheets

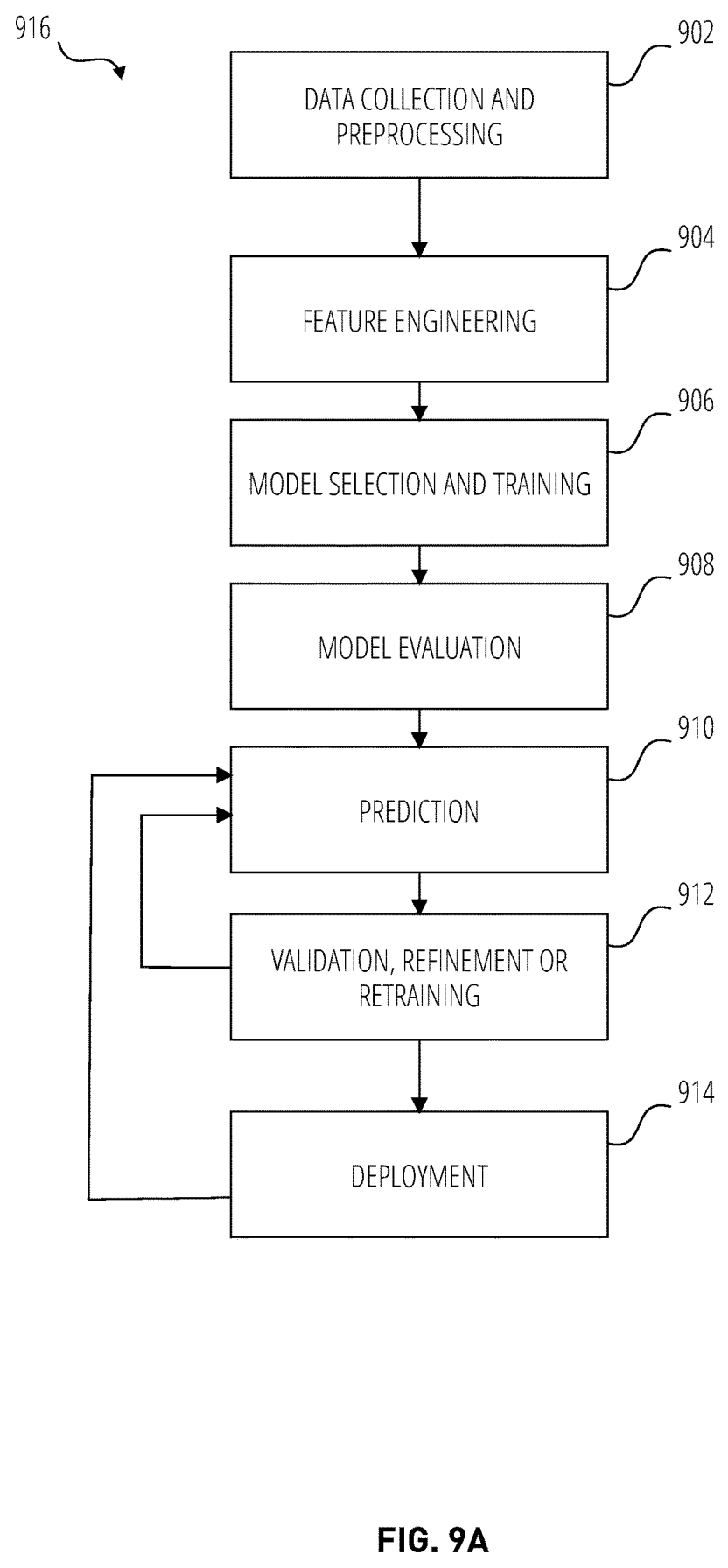

916

DATA COLLECTION AND PREPROCESSING 902

FEATURE ENGINEERING 904

MODEL SELECTION AND TRAINING 906

MODEL EVALUATION 908

PREDICTION 910

VALIDATION, REFINEMENT OR RETRAINING 912

DEPLOYMENT 914

FIG. 9A

AUGMENTED SEARCH ENGINE

TECHNICAL FIELD

Examples of the disclosure relate generally to search engines and, more specifically, to executing augmented searches.

BACKGROUND

Users use search engines to find information on Wide Area Networks. Traditional search engines do not provide sufficient interactivity with a user to provide relevant search results efficiently.

BRIEF DESCRIPTION OF THE DRAWINGS

The present disclosure will be understood more fully from the detailed description given below and from the accompanying drawings of various examples of the disclosure.

FIG. 9A illustrates a machine-learning pipeline, according to some examples.

DETAILED DESCRIPTION

Figure 1:
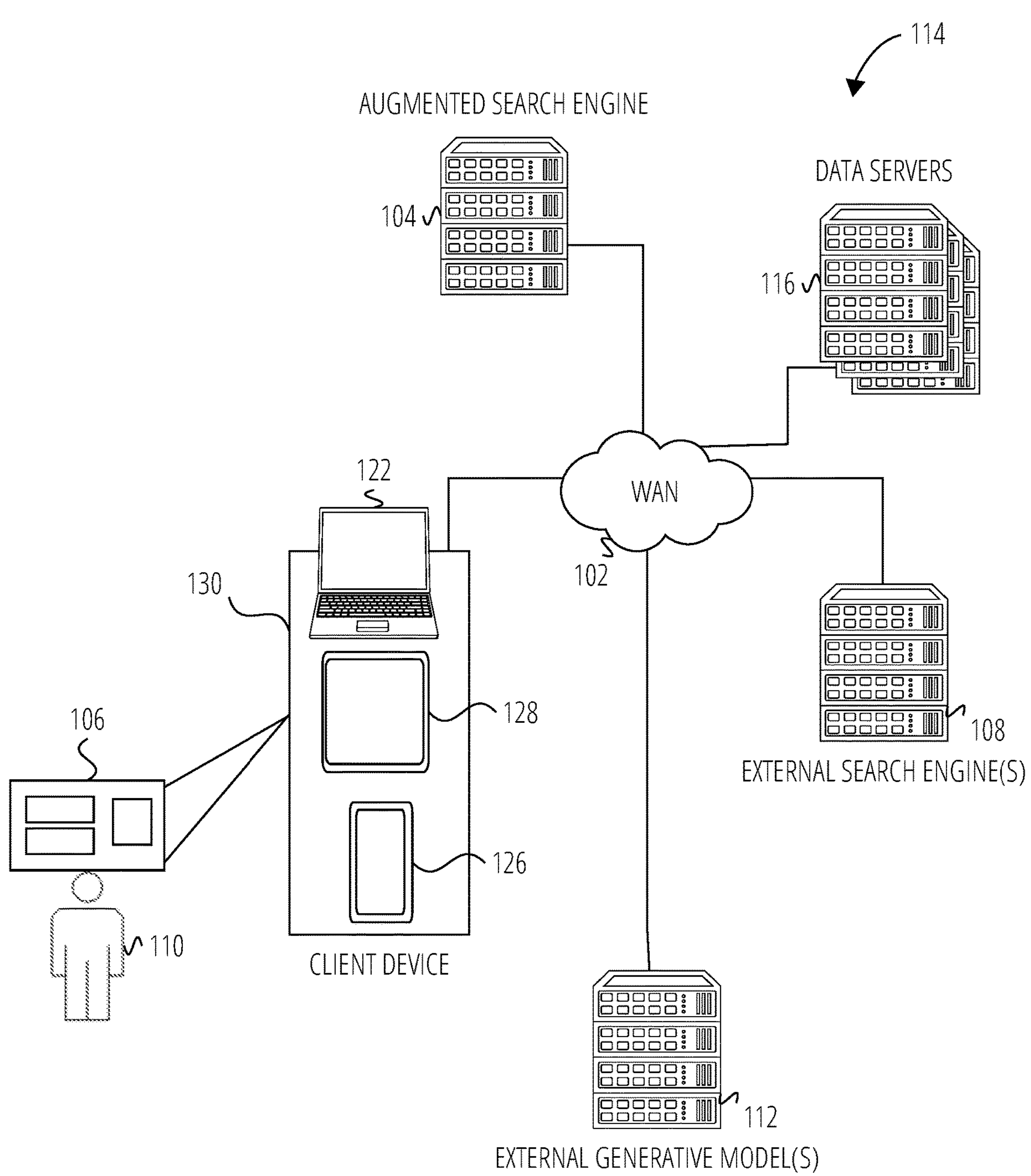
FIG. 1 is a system diagram of a system for performing an augmented search, according to some examples.

The Internet age has ushered in an era where information is both a valuable commodity and an overwhelming flood. Users across the globe turn to digital platforms to seek answers, insights, and data for a myriad of purposes ranging from academic research to personal curiosity. However, the sheer volume and diversity of information available online pose significant challenges in terms of efficiently locating relevant and accurate data. Traditional search methodologies often fall short in navigating this vast digital landscape, leading to a demand for more sophisticated and user-centric search solutions.

Traditional search engines often present challenges in effectively meeting the diverse requests of users seeking information online. The primary issues stem from limitations in the search process itself, which can lack that intuitiveness and efficiency allows users to easily find the information they seek. Despite advancements in search algorithms and indexing techniques, there remains a gap in how traditional search systems interact with users. These systems frequently fail to fully grasp the subtleties of initial queries, leading to a search experience that may not deliver results in a manner that is both thorough and easily understood.

In some examples, an augmented search engine generates a summary of search results in an augmented search, offering the feature of improved user comprehension. The augmented search engine can synthesize complex and voluminous search results into concise summaries, aiding users in quickly understanding the essence of the search results without needing to sift through each result individually. This facilitates easier and faster comprehension of the search outcomes.

In some examples, an augmented search engine enhances the user experience by providing summaries that capture the pertinent information from a broad set of search results. Users can quickly grasp the relevance of the search results to their query, leading to higher satisfaction with the search process and potentially increasing the likelihood of users returning to the augmented search engine for future information requirements.

In some examples, an augmented search engine contributes to time and resource efficiency. It streamlines the search process by reducing the time users spend analyzing individual search results. This efficiency benefits users and optimizes the use of computational resources within the augmented search engine, as the engine automates the summarization process that would otherwise require significant manual effort and processing power.

In some examples, an augmented search engine allows for customization and personalization. It can be trained to generate summaries tailored to specific user preferences or query contexts. By learning from user interactions and feedback, the augmented search engine can adapt its summarization techniques to better align with individual user requirements or preferences, offering a more personalized search experience.

In some examples, the scalability of an augmented search engine ensures that it can effectively serve a broad user base with varying information requirements, from simple queries to complex research topics. This scalability is useful for handling a wide range of queries and generating summaries for diverse sets of search results.

In some examples, an augmented search engine maintains quality control and consistency in the summaries it generates. This ensures that users receive reliable and coherent information regardless of the query, which is useful for building user trust in the augmented search engine's ability to provide valuable and accurate summaries.

In some examples, an augmented search engine is designed to extract and highlight insights, trends, or patterns within the search results, adding value by summarizing the content and by providing users with actionable insights derived from the aggregated search results.

In some examples, an augmented search engine effectively reduces information overload for users by condensing the search results into summaries. This reduction helps users focus on the relevant information, making the search process more manageable and less overwhelming.

In some examples, an augmented search engine receives an initial query for a search from a user, stores the initial query in a search state database, and utilizes the search state database to determine the next search phase. Upon determining that the next search phase includes a requirement of requesting additional user input, the augmented search engine generates a user prompt based on the initial query, stores this user prompt in the search state database, displays the user prompt to the user, and receives the user input in response to the user prompt.

In some examples, an augmented search engine, while determining a next search phase, further utilizes a search state classification model.

In some examples, an augmented search engine, in the process of generating the user prompt, employs a Large Language Model (LLM).

In some examples, an augmented search engine, in response to determining the next search phase is a search phase of searching one or more search indexes, generates one or more search queries using the search state database, stores the one or more search queries in the search state database, determines search results by querying one or more search engines using the one or more search queries, and stores the search results in the search state database.

In some examples, an augmented search engine, in generating the one or more search queries, further employs an LLM.

In some examples, an augmented search engine, in response to determining the next search phase is a search phase of generating a search summary, generates a search summary using the search state database and displays the search summary to the user.

In some examples, the augmented search engine, in generating the search summary, employs an LLM.

FIG. 1 is a system diagram of an augmented search system 114 for performing an augmented search, according to some examples. An augmented search engine 104 uses the augmented search system 114 to provide an augmented search to a user 110.

An augmented search engine 104 serves as a processing system where initial queries are received, analyzed, and processed. The augmented search engine 104 is equipped with processes and models that enable the augmented search engine 104 to interpret initial queries, generate user prompts for additional information, and utilize search queries refined by the additional information to search through various indexes and databases for relevant information as described herein.

The user 110 interacts with the augmented search engine 104 through an augmented search engine UI 106 hosted by a client device 130. The augmented search engine UI 106 provides the interface through which the user submits their initial query and interacts with any subsequent user prompts or search results presented by the augmented search engine 104. In some examples, an augmented search engine UI 106 may be incorporated into various applications such as, but not limited to, conversational chatbots, e-commerce platforms, online libraries and digital archives, customer support and helpdesk software, enterprise resource planning systems, customer relationship management software, educational platforms and learning management systems, healthcare information systems, legal research databases, job search and recruitment portals, travel and accommodation booking sites, and the like. In some examples, the augmented search engine UI 106 may be implemented as a component of a search engine accessible using a web browser via the WAN 102. Example client devices 130 include any device capable of accessing the augmented search engine 104 via the WAN 102 including, but not limited to, a personal computer 122, a notepad 128, a smart phone 126, a laptop computer, a tablet computer, a smartwatch, a smart television, a gaming console, an e-reader, a digital assistant device, a wearable fitness tracker, an in-vehicle infotainment system, virtual reality headsets, augmented reality glasses, smart home control panels, interactive kiosks, smart mirrors, smart refrigerators, industrial control systems with network access, and the like.

The augmented search engine 104 is connected to a Wide Area Network (WAN) 102, which facilitates communication between the augmented search engine 104, the augmented search engine UI 106, and external resources. In some examples, WAN 102 may be of a variety of network types designed to extend over large geographical areas, facilitating communication, data exchange, and resource sharing across distant locations such as, but not limited to, the Internet, a corporate network, a research and education network, a telecommunication network, and the like. The WAN 102 enables the augmented search engine 104 to access one or more external search engines 108 and one or more external generative models 112, expanding the scope of the search beyond the internal capabilities and databases of the augmented search engine 104.

In some examples, the augmented search engine 104 and the one or more external search engines 108 access one or more data servers 116 via the WAN 102. This allows the augmented search engine 104 to offer focused augmented searches. The one or more data servers 116 may include various types of data sources such as, but not limited to:

- Web Servers: These servers host websites and are responsible for accepting requests from clients (web browsers) and serving them web pages. For instance, the Apache HTTP Server and Microsoft's Internet Information Services (IIS) are examples of web servers that can host searchable content.
- Database Servers: These are specialized servers designed to host database services, where structured data can be stored, queried, and retrieved. Examples include MySQL, PostgreSQL, Oracle Database, and Microsoft SQL Server. These servers can support complex queries and are often used by websites and applications to store user data, product information, and other searchable content.
- File Servers: File servers are used to store and manage files in a network. They allow users to share and access files across the network. Examples include servers hosting shared drives within an organization or cloud-based storage services like Google Drive and Dropbox, where files and documents can be searched and retrieved.
- Content Management Systems (CMS): These are platforms that allow users to create, manage, and modify digital content without using specialized technical knowledge. Examples include WordPress, Drupal, and Joomla. A CMS typically runs on a web server and stores content in a database server, making the content searchable through the website's search function.
- Cloud Storage Services: These services offer storage and retrieval of data over the internet. Examples include Amazon S3, Microsoft Azure Storage, and Google Cloud Storage. They can host a wide variety of data, from website assets to big data for analytics, and provide APIs for searching and accessing the stored data.

During operation, the augmented search engine 104 requests an initial search query from the user 110 using an augmented search UI displayed to the user 110 using the augmented search engine UI 106. The augmented search engine 104 receives the initial query and initiates an augmented search process. During the augmented search process, the augmented search engine 104 determines a search phase of the search process and guides the search according to the determination. In a case that the augmented search engine 104 determines that additional user input is useful, the augmented search engine 104 prompts the user 110 to provide additional user input based on the search query as described herein. The augmented search engine 104 generates one or more search queries that are used to query an internal index search engine hosted by the augmented search engine 104 and/or query the one or more external search engines 108 as described herein. The augmented search engine 104 receives search results from the internal index search engine or the one or more external search engines 108 and uses either an internal search summary generative model or an external general purpose external generative model of the one or more external generative models 112 to generate a search summary of the search results. The augmented search engine 104 displays the search summary to the user 110 using the augmented search engine UI 106 via the WAN 102.

Figure 2A:
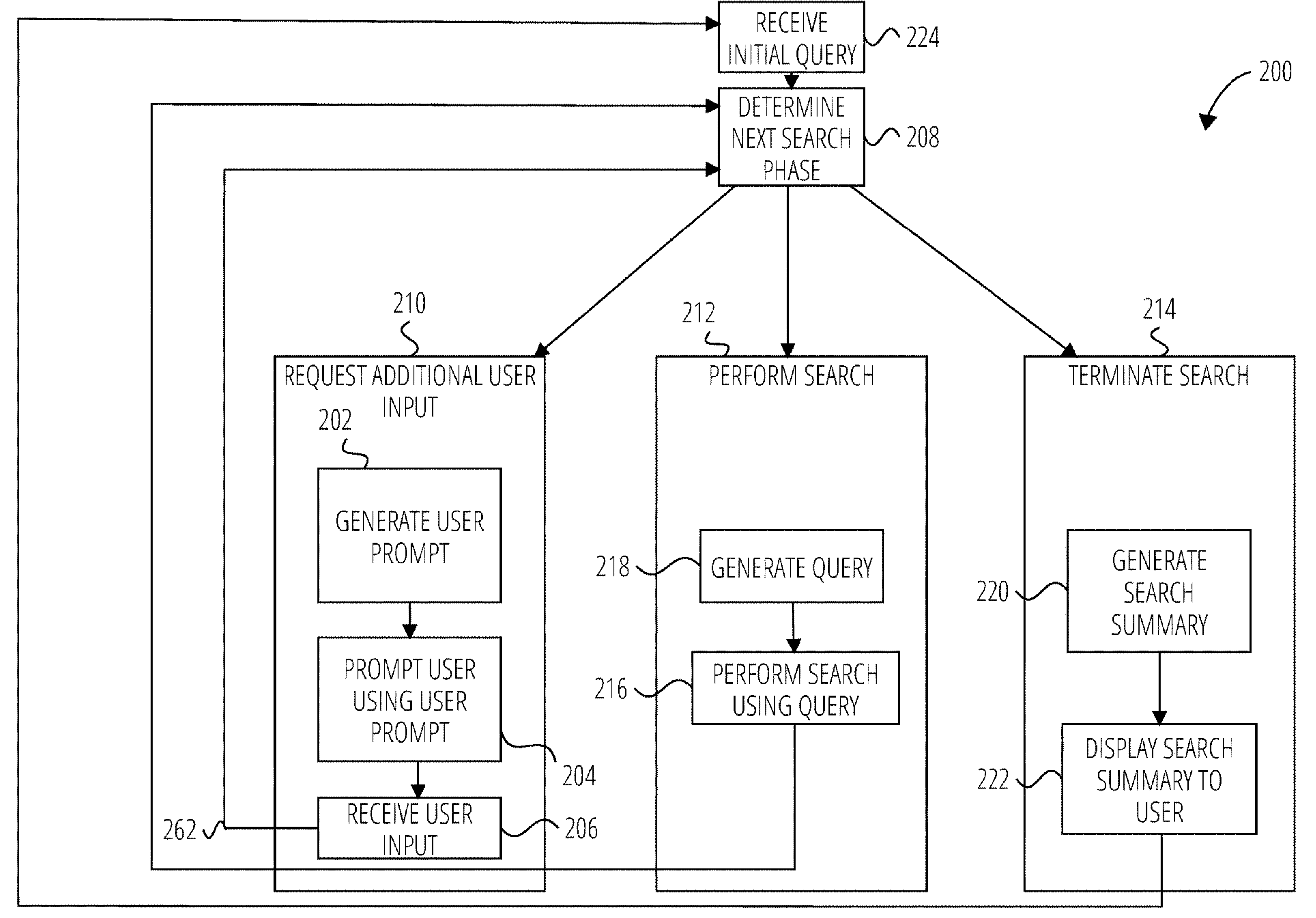
FIG. 2A is a process flow diagram of an augmented search method for performing an augmented search, according to some examples.
Figure 2B:
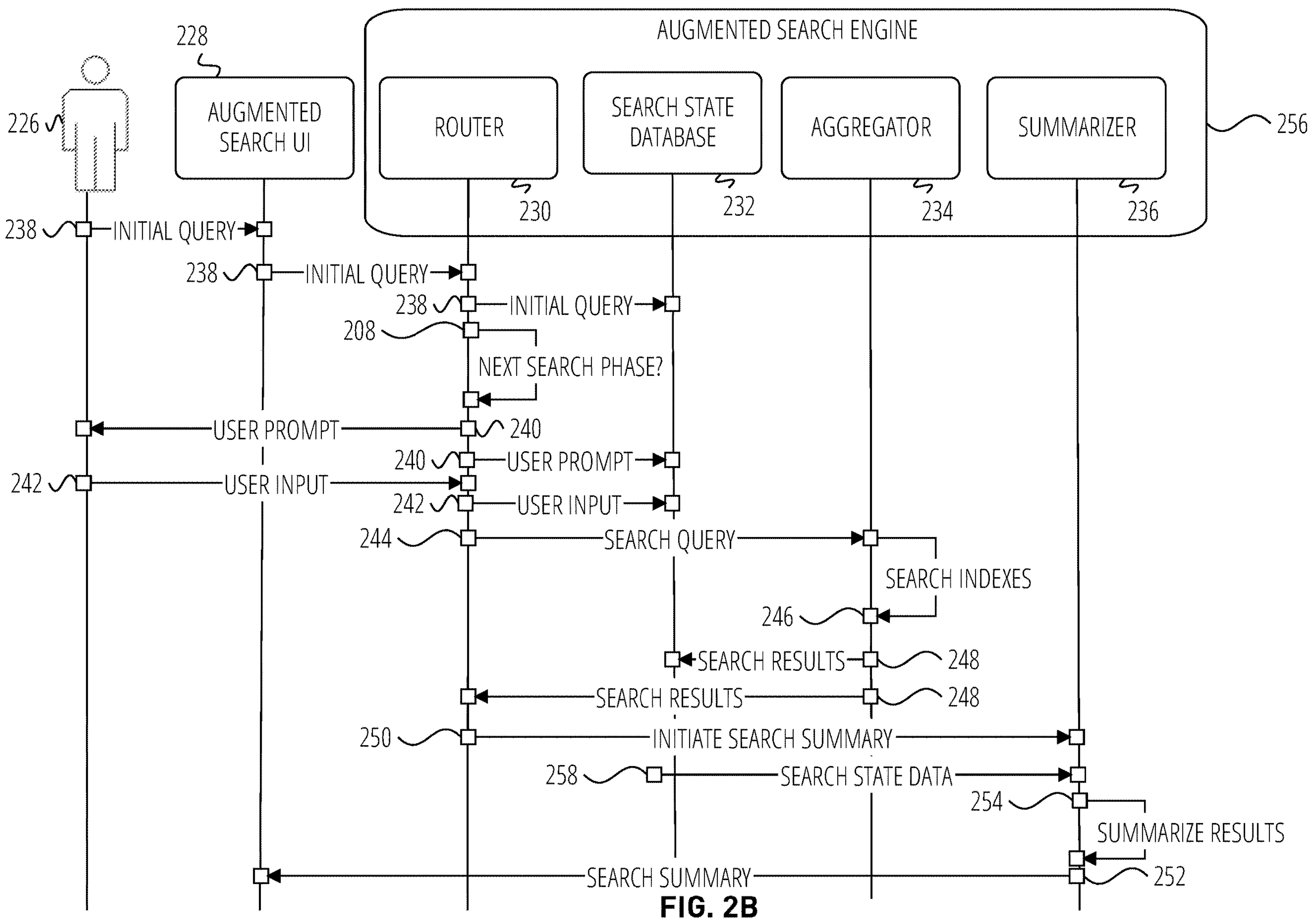
FIG. 2B is a sequence diagram of an augmented search method for performing an augmented search, according to some examples.

FIG. 2A is a process flow diagram and FIG. 2B is a sequence diagram of an example augmented search method 200 for performing an augmented search, according to some examples. An augmented search engine 256 uses the augmented search method 200 to perform an augmented search of one or more search indexes using one or more search engines. Although the example augmented search method 200 depicts a particular sequence of operations, the sequence may be altered without departing from the scope of the present disclosure. For example, some of the operations depicted may be performed in parallel or in a different sequence that does not materially affect the function of the augmented search method 200. In other examples, different components of augmented search engine 256 that implements the augmented search method 200 may perform functions at substantially the same time or in a specific sequence.

In operation 224, a router 230 of the augmented search engine 256 receives an initial query 238 from a user 226. For example, the router 230 receives the initial query 238 submitted by the user 226 via an augmented search User Interface (UI) 228 using a user prompt screen as more fully described in reference to FIG. 6A and FIG. 6B. The reception of the initial query 238 marks the beginning of the augmented search, enabling the augmented search engine 256 to proceed with analyzing and processing a search request from the user 226.

In some examples, the router 230 stores the initial query 238 in a search state database 232. The search state database 232 stores a search state data of an augmented search and is used by components of the augmented search engine 256 to determine a state of the augmented search method 200.

In some examples, in addition to the initial query 238 and the user prompt 240, search state data may include various types of information to enhance the search process and user experience including, but not limited to:

User input responses: Records of user responses to user prompts 240, which can be used to refine search queries 244 or determine the next steps in the search process.

Search results: Information about search results 248 obtained from querying search indexes, which can be used for generating search summaries 252 or for further refinement of search queries 244.

Search queries: The evolution of a search query from the initial query 238 through various refinements based on user input and system-generated prompts.

User session data: Data capturing the sequence of actions taken by the user during a session, which can help in understanding user behavior and preferences.

Intermediate search phases: Snapshots of the search phase at various points, which can be used to backtrack or understand the decision-making process of the system.

Search preferences: User-specified preferences or settings that influence search behavior, such as filters, search domains, or language preferences.

Query classification data: Information related to the classification of queries into categories or intents, which can guide the generation of prompts or the selection of search strategies.

Search metrics: Performance metrics or analytics data related to the search process, such as response times, accuracy of results, or user satisfaction indicators.

Error logs: Records of any errors or issues encountered during the search process, which can be useful for debugging or improving the system.

Feedback data: User feedback on the search results or the overall search experience, which can be used for continuous improvement of the system.

Initially, the search state data includes the original initial query 238 (of FIG. 2B) as submitted by the user 226 (of FIG. 2B). This is the starting point of the search process and serves as a reference for subsequent actions. Following the reception of the initial query 238, the augmented search engine 256 may use a user prompt 240 to request additional user input 242 (of FIG. 2B) if the initial query 238 is deemed ambiguous or insufficiently detailed. The details of this request, along with any user input 242 received in response, are also stored as part of the search state data. This interaction provides for refining the search parameters and is annotated for further analysis and optimization.

As the search process unfolds, the augmented search engine 256 generates one or more optimized search queries 244 based on the original initial query 238 and any additional user input 242. These optimized search queries, designed to retrieve relevant search results 248, are stored as part of the search state data in the search state database 232. The storage of these search queries 244 allows for a detailed understanding of how initial queries are transformed and optimized over the course of a search session.

In some examples, the search results 248 include the results themselves and also metadata such as the source of the results, the ranking of the search results, and any filtering or categorization applied.

In some examples, user interactions with these search results, such as clicks, time spent on a result, and any feedback provided, are recorded and stored as search state data. This interaction data is used for assessing the relevance and quality of the search results and for making adjustments to improve future search outcomes.

In some examples, the search state data may include contextual information related to the search session. This encompasses data about a device hosting the augmented search UI 228, location, time of the search, and any other environmental or situational factors that could influence the search process. Contextual information helps in tailoring the search experience to the specific requests and circumstances of the user 226.

In some examples, the search state data may capture the state of the search at various checkpoints. This includes the sequence of actions taken during the search, any changes to the search parameters, and the status of the search at different stages. Storing the state of the search allows for the resumption of interrupted search sessions and provides insights into the search process's dynamics.

In operation 208, the router 230 determines a search phase of the augmented search method 200. In some examples, a search phase is a request additional user input phase 210 where the augmented search method 200 requests additional information from the user 226 using one or more user prompts. In some examples, a search phase is a perform search phase 212 in which the augmented search method 200 performs an augmented search using one or more search engines. In some examples, search phase is a generate search summary phase 214 in which the augmented search method 200 generates a search summary that is presented to the user 226.

Figure 3:
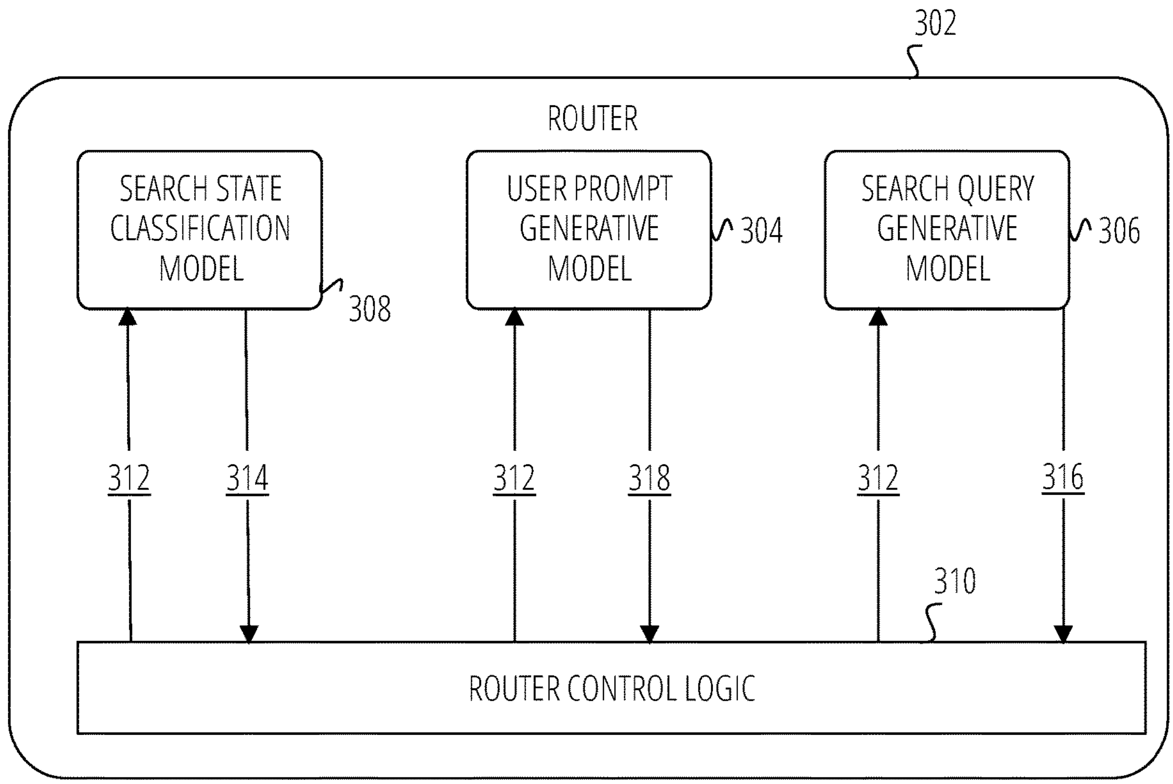
FIG. 3 is an architecture diagram of a router for performing an augmented search, according to some examples.

For example, in reference to FIG. 3, a router 302 includes a search state classification model 308 that analyzes search state data 312 including an initial query to determine if the initial query contains sufficient amounts of information for the augmented search engine 256 to perform an effective search. The search state classification model 308 operates by applying predefined criteria to the search state data 312 including the initial query, assessing the specificity and relevance of the initial query as expressed in a next search phase 314 determination. Based on the next search phase 314, the router 302 can then decide on the next search phase such as, but not limited to proceeding directly to a perform search phase or requesting additional user input from the user in a request additional user input phase. This process provides for optimizing the search operation by determining that the augmented search engine has sufficient information to retrieve relevant results from a search.

In some examples, the search state classification model 308 is part of a processing pipeline that extracts features from the initial query. These features encompass various aspects such as a length of the initial query, a presence of specific keywords or phrases, a use of question formats, and other linguistic or semantic properties indicative of the completeness and specificity of the initial query.

In some examples, the router 302 performs an initial search using an initial query to determine a set of intermediate search results. These intermediate search results are stored in the search state database 232 (of FIG. 2B) as part of the search state data 312 and provided to the search state classification model 308 including the initial query to determine if the initial query provides sufficient information to provide adequate results from a search.

Figure 9B:
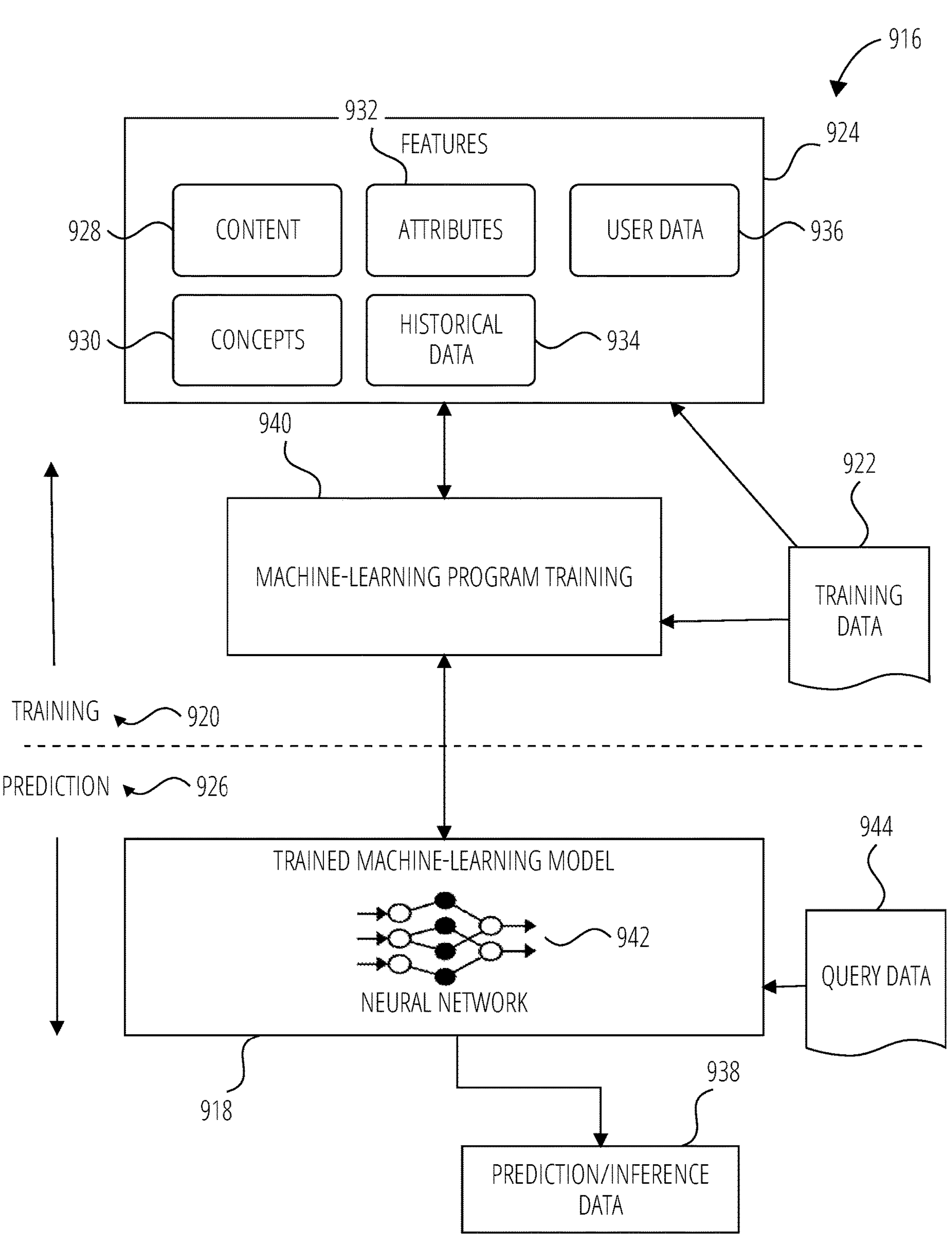
FIG. 9B illustrates training and use of a machine-learning model, according to some examples.

In some examples, as more fully described in reference to FIG. 9A and FIG. 9B, the search state classification model 308 is trained to a dataset of initial queries. These initial queries are annotated according to their adequacy in generating useful search results, allowing the search state classification model 308 to discern patterns and correlations between the features of the queries and their effectiveness. To make predictions about new, unseen queries, the search state classification model 308 employs a classification algorithm. This could be logistic regression, decision trees, neural networks, or any other suitable algorithm that can handle the complexity of the feature space and the nuances of the training data. Training data to determine whether an initial query contains enough information to perform an augmented search includes, but is not limited to:

- Initial queries: A diverse collection of initial queries submitted by users, covering various topics, domains, and levels of specificity. These queries should range from very detailed and specific to vague and ambiguous, to provide the model with examples across the spectrum of query completeness.
- User interactions: Data capturing the interactions between the augmented search engine and users following the submission of initial queries. This includes any clarifying questions posed by the search engine and the corresponding user responses. These interactions are crucial for teaching the model how additional information can transform an incomplete query into one that is ready for a search.
- Query annotations: Initial queries and subsequent user interactions are annotated to indicate whether the query, at each stage of interaction, contains enough information to perform a search. These annotations serve as the ground truth for training the model.
- Search outcomes: Information about the success of searches conducted based on the initial queries and user interactions including metrics such as relevance scores of search results, user satisfaction ratings, or click-through rates, which help to validate the completeness and effectiveness of the queries.
- Contextual information: Additional data that provides context to the initial queries and user interactions, such as the time of day the query was made, the user's search history, and any preferences or constraints specified by the user. This information can be useful for understanding the circumstances under which a query is considered complete.
- Extracted features: The training data is processed using natural language processing (NLP) techniques to extract meaningful features from the textual data. This includes, but is not limited to, tokenization, part-of-speech tagging, named entity recognition, and sentiment analysis, among others, to capture the semantic and syntactic characteristics of the queries and interactions.
- Balanced examples: The training dataset includes, but is not limited to, a balanced mix of examples where queries are deemed complete and ready for a search and examples where queries require additional information. This balance is necessary to prevent model bias towards one outcome over the other.

In some examples, the search state classification model 308 is continuously trained using a feedback loop. This mechanism enables continuous improvement of the classifications of the search state classification model 308 by using the outcomes of predictions to refine training data of the search state classification model 308 and retrain the search state classification model 308. Such a loop allows the search state classification model 308 to adapt to new patterns in initial query behavior and changes over time, enhancing accuracy and reliability of the search state classification model 308.

In some examples, using a search state classification model 308 to determine if an initial query contains enough information to perform an augmented search provides several features that significantly enhance both the efficiency and effectiveness of the search process. One of the features is improved search efficiency. By accurately identifying whether an initial query contains sufficient information, the search state classification model 308 helps streamline the search process. This prevents an augmented search engine from initiating searches based on incomplete or ambiguous queries that are unlikely to yield useful results, thereby reducing unnecessary computational load and improving response times for users.

In some examples, another feature is the enhancement of the user experience. The search state classification model 308 contributes to a more interactive and responsive search experience by triggering the augmented search engine to request specific clarifications from the user when additional information is needed. This interaction ensures that users are guided towards refining their queries in a manner that directly addresses their information requirements, leading to more satisfactory search outcomes.

In some examples, the use of the search state classification model 308 increases the relevance of search results. By ensuring that searches are conducted only when queries are sufficiently detailed, the likelihood of retrieving relevant and accurate search results is increased. This relevance is crucial for user satisfaction and can significantly enhance the perceived value and effectiveness of an augmented search engine.

In some examples, the search state classification model 308 also adapts to user intent, allowing the augmented search engine to better understand what the user is actually seeking, even if their initial query was not explicitly clear. This adaptability is based on the ability of the search state classification model 308 to assess query completeness by analyzing the initial query and any subsequent user interactions.

In some examples, as the search state classification model 308 processes more initial queries and user interactions, the search state classification model 308 continuously learns and improves its ability to assess query completeness. This ongoing learning process enables the search state classification model 308 to adapt to changes in user behavior, query patterns, and information requirements, ensuring that the augmented search engine remains effective and responsive over time.

In some examples, the operation of the search state classification model 308 generates data on common patterns of query incompleteness and user interaction. Analyzing this data can provide insights into how users formulate queries and what types of information tend to be missing. These insights can inform further improvements to the user interface of the augmented search engine and query processing algorithms.

In some examples, the automated nature of the search state classification model 308 allows the augmented search engine to handle large volumes of queries efficiently. By automating the assessment of initial query completeness, the search state classification model 308 enables the augmented search engine to scale its operations to accommodate growing numbers of users and queries without compromising on the quality of the search experience. Collectively, these features contribute to more efficient search processes, improved user experiences, and the ongoing improvement and scalability of the augmented search engine.

Referring to FIG. 2A and FIG. 2B, in response to determining that the augmented search method 200 is in a request additional user input phase 210 because the initial query 238 is inadequate to generate relevant search results, the router 230 determines to request additional user input 242 in a request additional user input phase 210 in order to overcome the deficiencies of the initial query.

In operation 202, the router 230 generates a user prompt 240 for the user 226 using the initial query 238. For example, in reference to FIG. 3, a router 302 uses a user prompt generative model 304 (e.g., a Large Language Model (LLM) or the like) to generate a user prompt 240 based on the search state data 312 including an initial query. In some examples, the user prompt generative model 304 is trained on datasets of search state data 312 including initial queries and corresponding prompts that were found to effectively elicit more detailed or specific information from users as more fully described in reference to FIG. 9A and FIG. 9B. This training enables the user prompt generative model 304 to understand the nuances of human language and the common patterns or gaps in queries that might require further clarification. Training data for training the user prompt generative model 304 includes, but is not limited to:

User queries and responses: A collection of user queries followed by the responses or additional information provided by users when prompted. This dataset covers a wide range of topics and query complexities to teach the user prompt generative model 304 about different types of information that might be missing from initial queries.

Prompt and response pairs: Examples of effective user prompts that have previously led to users providing useful additional information, paired with the user responses to these user prompts. Analyzing these pairs helps the user prompt generative model 304 learn how to formulate prompts that are likely to elicit detailed and relevant information from users.

Annotated queries: Queries annotated with information about what specific details are missing or what aspects of the query need clarification. These annotations serve as a guide for the user prompt generative model 304 to understand the common patterns of incomplete information in user queries.

Contextual information: Data providing context to the initial queries, such as the user's search history, the time of the query, and any preferences or constraints specified by the user. This information is used for generating personalized prompts that are relevant to the user's current search context.

User interaction data: Data capturing the entire interaction flow between the user and the augmented search engine, including the user prompts presented to the user and their subsequent responses. This view of the interaction helps the model understand the progression of a search session and how different user prompts contribute to refining the search.

Feedback on prompt effectiveness: User feedback or engagement metrics related to the effectiveness of different user prompts, such as the rate of user response to user prompts, the relevance of the information provided by users, and user satisfaction with the search outcomes following the user prompts. This feedback helps in evaluating and improving the quality of the prompts generated by the user prompt generative model 304.

In some examples, the training data is enriched with NLP features extracted from the queries and responses, such as named entity recognition, part-of-speech tagging, and sentiment analysis. These features help the user prompt generative model 304 grasp the linguistic structure and semantic content of the queries and responses.

When the router 302 passes the search state data 312 including the initial query to the user prompt generative model 304 using the router control logic 310, the user prompt generative model 304 analyzes the initial query using the patterns the user prompt generative model 304 has learned and generates a user prompt 318.

In some examples, an analysis involves breaking down the initial query into its constituent features, such as the topics mentioned, the specificity of the language used, and any keywords that might indicate what the user is looking for. Based on this analysis, the user prompt generative model 304 generates a user prompt 240 that is tailored to the initial query. The user prompt 318 is designed to be clear and direct, asking the user for specific information to refine the search. For example, if the initial query is vague or broad, the generated user prompt 318 might ask the user to specify a particular aspect of their initial query or to provide additional keywords.

In some examples, the user prompt 318 takes the form of one or more questions that are asked of the user. For example, if an initial analysis of the initial query determines that are multiple interpretations of a term and the correct interpretation of the term is not discernible from the initial query, the user prompt 318 may take the form of a question that disambiguates the term.

In some examples, the router 302 performs an initial search using the initial query to obtain intermediate search results that are used along with the initial query to generate the user prompt 318.

In some examples, the router 302 provides the user prompt generative model 304 with a search state data 312. The search state data 312 is used as a context by the user prompt generative model 304 when generating the user prompt 318.

In some examples, a user prompt generative model is external to an augmented search engine such as, but not limited to, a general purpose LLM hosted by a third party. In such an arrangement, the router 302 uses router control logic 310 to compose a generation prompt for generated a user prompt using the search state data 312 including the initial query. The generation prompt is communicated to the external user prompt generative model, and the user prompt 318 is received from the external user prompt generative model using an Application Programming Interface (API) of the external user prompt generative model. In some examples, the prompt sent to the external user prompt generative model is generated using the initial query and the search state data 312.

Utilizing a user prompt generative model 304 for generating user prompts 318 in an augmented search offers a multitude of technical features that enhance the search experience. In some examples, a benefit is personalization, where the user prompt 318 can use the search state data 312 including user data including a search history to tailor prompts to a user's specific query context and preferences, thereby boosting user engagement and satisfaction by providing a more intuitive search interface. This approach also brings about greater efficiency by automating the generation of user prompts, allowing the router 302 to swiftly respond to user queries without manual intervention and reducing the time between a user's query and an augmented search engine requests for additional information.

In some examples, the user prompt generative model 304 is adaptable, enabling the user prompt generative model 304 to adjust to new types of queries or shifts in user behavior over time. This ensures the augmented search engine remains effective and relevant. The incorporation of natural language processing (NLP) techniques enhances the contextual understanding of the user prompt generative model 304, enabling the user prompt generative model 304 to grasp the intent behind a user's query more accurately and generate more relevant user prompts 318. This capability improves the likelihood of retrieving accurate and useful search results.

In some examples, errors are reduced during user prompt 318 generation, which might occur with manual or rule-based systems. By leveraging the user prompt generative model 304 trained on extensive data, the augmented search engine minimizes errors, thereby maintaining user trust in the capabilities of the augmented search engine.

In some examples, use of the user prompt generative model 304 promote scalability by handling a large volume of queries across different domains without the need for domain-specific adjustments, facilitating system expansion and accommodation of a growing user base.

In some examples, the use of the user prompt generative model 304 for user prompt 318 creation fosters a more interactive search experience. By engaging users in a dialogue, the augmented search engine can refine its understanding of the user's requirements, leading to more accurate and satisfying search outcomes.

Referring the FIGS. 2A and 3B, In operation 204, the augmented search engine 256 prompts the user 226 by displaying a user prompt 240 to the user 226 via the augmented search UI 228, inviting the user 226 to respond to the user prompt 240 with more detailed information in the form of user input 242. In some examples, the router 230 stores the user prompt 240 in the search state database 232 as part of search state data of a search process for further use by the components of the augmented search engine 256.

In operation 206, the router 230 receives the user input 242 from the user 226 in response to the user prompt 240 and transitions 262 to operation 208 for further processing.

In operation 208, the router 230 determines a next search phase of the augmented search method 200. For example, in reference to FIG. 3, the search state classification model 308 determines that the router 302 has enough information to begin an augmented search. The search state classification model 308 is trained using a training dataset that includes sets of search state data that indicate that the router 302 has enough information to perform a search as more fully described in reference to FIG. 9A and FIG. 9B. Example training data for training the search state classification model 308 to recognize that an augmented search process is prepared to enter a search performance phase includes, but is not limited to:

- Initial queries: A collection of initial queries that vary in specificity and clarity. This would include queries that are well-defined and contain sufficient detail for a search to be conducted without additional user input.
- User prompts and user inputs: For queries that initially lacked clarity or specificity, the dataset should include the prompts generated by a system to request more information and the corresponding user responses. Instances where the user responses effectively clarify or complete the query information would be labeled as ready for search.
- Search queries: The final search queries derived from the initial queries and any subsequent user interactions. These search queries should represent a state where the query is deemed complete and actionable for performing a search.
- Contextual information: Additional data points that provide context to the queries, such as the time of the query, the user's search history, and any preferences or settings that might influence the readiness of the search phase.
- Intermediate search results: Instances that capture the state of the search at various checkpoints, including any intermediate search results, the evolution of the search query, and changes in search parameters. These instances help the model learn the progression towards a search-ready state.

In some examples, employing the search state classification model 308 to ascertain whether a search is in a state ready to be performed in a search phase offers features that enhance the efficiency and effectiveness of an augmented search engine. A feature is the ability to automate the decision-making process regarding the readiness of a search. This automation reduces the need for manual intervention, streamlining the search process and enabling the augmented search engine to handle a larger volume of queries more swiftly. By accurately identifying when enough information has been gathered to proceed with a search, the search state classification model 308 ensures that searches are initiated at the optimal time, thereby improving the user experience by delivering timely and relevant search results.

In some examples, another feature is the improvement in search result relevance. The capability of the search state classification model 308 to discern whether the collected information is sufficient for a search allows for the initiation of searches only when the augmented search engine has a clear understanding of the intent of the user. This clarity in understanding the intent of the user leads to more accurate and targeted search results, as the augmented search engine can effectively utilize the available information to refine the search parameters. Consequently, users receive search results that are more closely aligned with their information requirements, enhancing their satisfaction with the augmented search engine.

In some examples, the use of a search state classification model 308 contributes to a more dynamic and responsive augmented search engine. By continuously evaluating the search phase based on user inputs and interactions, the search state classification model 308 allows the augmented search engine to adapt to the user's evolving information requirements in real-time. If the search state classification model 308 determines that additional information is required, an augmented search engine can prompt the user for further clarification, ensuring that the search process is guided by the current and comprehensive understanding of the user's query. This adaptability improves the accuracy of search results and fosters a more engaging and interactive search experience for the user.

In some examples, the implementation of a search state classification model 308 enhances the augmented search engine's scalability. As the volume of queries and the diversity of user information requirements grow, the search state classification model 308 ensures that the augmented search engine can efficiently manage and respond to these queries without compromising on the quality of search results. The ability of the search state classification model 308 to automate the assessment of search readiness allows the augmented search engine to scale its operations, accommodating an increasing number of users and queries while maintaining high standards of performance and user satisfaction. This scalability provides for the long-term success and reliability of the augmented search engine, ensuring it can meet the demands of its users effectively.

Referring to FIG. 2A and FIG. 2B, in response to determining that the augmented search method 200 is ready to enter a perform search phase 212, the router 230 transitions to operation 218.

In operation 218, the router 230 generates a search query 244. For example, in reference to FIG. 3, a router 302 uses a search query generative model 306 to generate one or more search queries 316. Inputs into the search query generative model 306 vary depending on the path that lead to an augmented search engine being an a search phase of being ready to perform a search. In some examples, an initial query may have been sufficient to generate the one or more search queries 316 and the search query generative model 306 uses the initial query to generate the one or more search queries 316. In some examples, the augmented search engine may have received user input along with the initial query and the search query generative model 306 generates the one or more search queries 316 using the initial query and the user input. In some examples, search state data 312 of an augmented search is supplied as context to the search query generative model 306.

The inputs into the search query generative model 306 encapsulate the intent of the user and may vary in complexity from simple keyword-based queries to more complex natural language questions or statements.

In some examples, the router control logic 310 preprocesses the inputs to the search query generative model 306 to clean and normalize the input data. Tasks during preprocessing may include lowercasing text, removing punctuation, correcting misspellings, and tokenizing initial queries and user inputs into individual words or phrases, aiming to standardize the input for better analysis by the search query generative model 306.

In some examples, following preprocessing, the router control logic 310 extracts relevant features from the inputs to the search query generative model 306. These features may include both semantic and syntactic elements used to understand the user's intent. In some examples, to enrich the feature set, advanced natural language processing (NLP) techniques such as part-of-speech tagging, named entity recognition, and dependency parsing are employed.

In some examples, the search query generative model 306 is trained during a training phase as more fully described in reference to FIG. 9A and FIG. 9B. Training data used to train the search query generative model 306 includes, but is not limited to:

- Initial queries and search intent: This data consists of initial queries, which are textual representations of users' information requests. These queries can range from simple, keyword-based queries to complex, natural language questions. An initial query is associated with the intended search intent, which defines what the user is looking for. This intent can be explicit or implicit within the query text.
- Optimized search queries: For an initial query, the training data includes one or more optimized search queries. These are the queries that have been refined or reformulated to better match the search intent with the content available in search indexes. Optimized search queries are designed to improve the relevance and precision of search results.
- Search results and relevance feedback: In addition to the queries themselves, the training data may also include information about the search results generated by the optimized search queries and user interactions with these results. This can include click-through data, dwell time on search results, and explicit relevance feedback provided by users. Such data helps the model learn which query formulations are effective in leading to satisfactory search outcomes.
- Contextual information such as search state data: The training data can also incorporate contextual information that influences the formulation of search queries. This includes the user's geographical location, the time of the query, the device used for the search, and any session information that provides context to the user's search behavior. Contextual information helps the model understand variations in query formulation based on external factors.

- Semantic annotations: To enhance the model's understanding of natural language queries, the training data may be enriched with semantic annotations. These annotations can include named entity recognition, part-of-speech tagging, and semantic roles of words or phrases within the queries. Semantic annotations aid the model in grasping the linguistic structure and meaning of the queries.
- Synthetic queries: In addition to real initial queries, the training data may include synthetic queries generated through data augmentation techniques. These synthetic queries can help increase the diversity of the training data, especially in covering rare or underrepresented query types.

In some examples, a search query generative model is external to an augmented search engine such as, but not limited to, a general purpose LLM hosted by a third party. In such an arrangement, the router 302 uses router control logic 310 to compose a search query generation prompt using the an initial query, user input, and search state data 312, or any combination thereof. The search query generation prompt is communicated to the external search query generative model and the one or more search queries 316 using an API of the external search query generative model.

In some examples, the utilization of a search query generative model 306 in an augmented search engine presents several features that enhance the search process and user experience. One of the features is the ability of the search query generative model 306 to refine and optimize user queries based on initial inputs and subsequent interactions. This optimization process provides for the search queries 316 to be precisely aligned with a user's intent, leading to more relevant and accurate search results. By understanding the nuances of user queries and incorporating additional information provided by users, the search query generative model 306 tailors the search queries in a way that improves the likelihood of retrieving information that meets the user's expectations.

In some examples, another feature is the capacity of the search query generative model 306 to handle a wide range of query complexities and domains. The search query generative model 306 is trained on a diverse dataset that includes various topics, query structures, and user interaction patterns. This training enables the search query generative model 306 to adapt to different user queries, regardless of their complexity or the specific domain they pertain to. As a result, the augmented search engine becomes more versatile and capable of serving a broader user base with varying information requirements.

In some examples, the search query generative model 306 also contributes to a more efficient search process. By automatically generating optimized search queries, the model reduces the need for manual query refinement and speeds up the search initiation phase. This efficiency saves time for the users and enhances the overall performance of the augmented search engine by allowing it to process queries more quickly and respond to user requests in a timely manner.

In some examples, the use of a search query generative model 306 facilitates a more interactive and engaging search experience. The model's ability to generate queries based on user interactions, such as responses to clarifying questions, encourages users to engage more deeply with the search process. This interactive approach helps in refining the search queries and makes the search experience more personalized and user-centric. Users feel more involved in the search process, which can lead to higher satisfaction with the search outcomes.

In some examples, the implementation of a search query generative model 306 enhances the learning capabilities of an augmented search engine. As the search query generative model 306 processes more queries and interactions, it continuously learns and improves its query generation capabilities. This ongoing learning process ensures that the search query generative model 306 remains up-to-date with evolving user behaviors and preferences, thereby maintaining its effectiveness over time. The adaptability of the search query generative model 306 and learning potential make the augmented search engine more robust and capable of meeting the changing requirements of its users.

In reference to FIG. 2A and FIG. 2B, in operation 216, the augmented search engine 256 determines search results 248 by searching 246 one or more search indexes using the search query 244. For example, the router 230 communicates the search query 244 to an aggregator 234 of the augmented search engine 256. The aggregator 234 uses the search query 244 to search through one or more search indexes using one or more search engines, looking for information that matches the criteria set out in the search query 244. This step bridges the gap between the intent of the user 226 and a large amount of information available across various sources, guiding the search engine in its quest to provide the user 226 with accurate and relevant search results.

Figure 4:
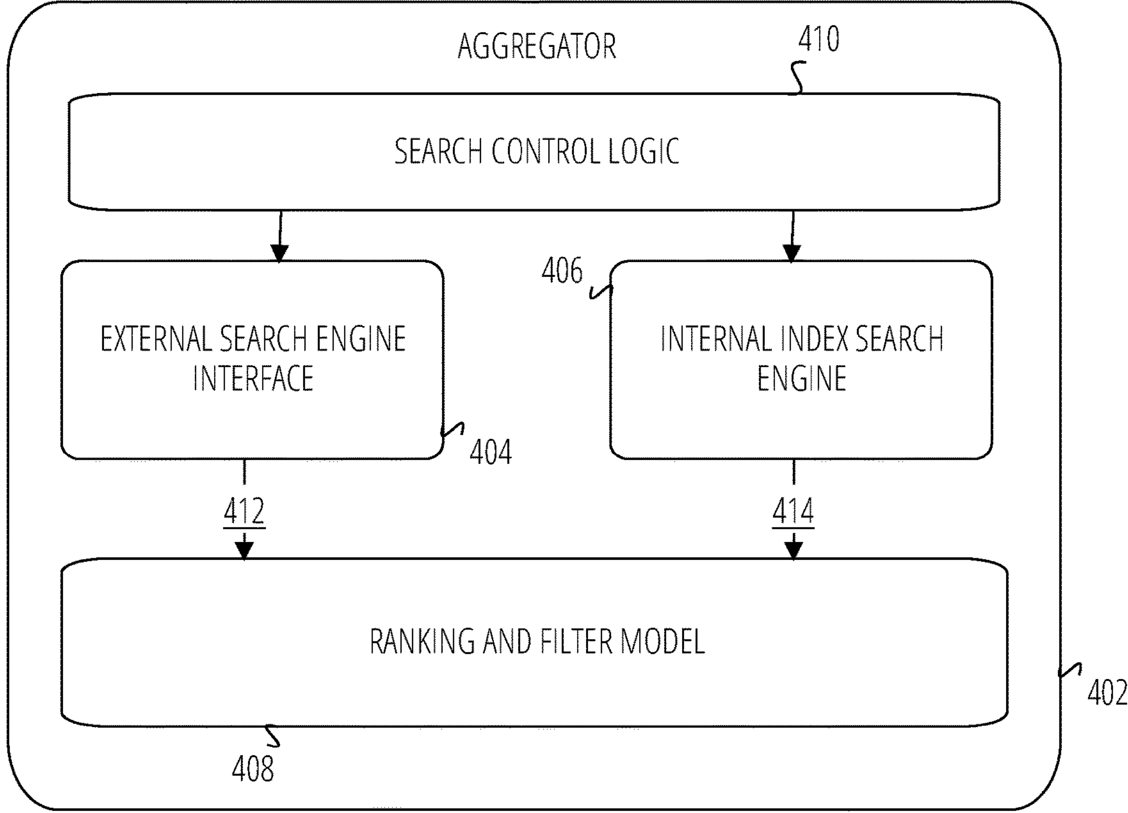
FIG. 4 is an architecture diagram of an aggregator for performing an augmented search, according to some examples.

In reference to FIG. 4, in some examples, an aggregator 402 includes search control logic 410 that manages and controls a search based on one or more search queries provided by a router. In some examples, the aggregator 402 includes an external search engine interface 404 used to access search engines that are external to an augmented search engine. In some examples, the aggregator 402 functions as a central component within an augmented search engine, orchestrating the retrieval of information from various external search engines to satisfy a search query.

Upon receiving a search query that has been generated or refined by a search query generative model, the aggregator 402 initiates the search process by identifying the appropriate external search engines that are likely to yield relevant results for the given query. This determination is based on the nature of the query, the known strengths and specializations of available search engines, and possibly the user's search history or preferences. In some examples, the aggregator 402 uses search state data to determine which external search engines are to be queried.

In some examples, the aggregator 402 formulates search requests tailored to the query syntax and requirements of a selected external search engine. This may involve translating the search query into the specific format or query language used by an external search engine, as well as setting parameters or options that can influence the search results, such as the desired number of results, filters for content type, or geographical targeting.

Once the search queries are prepared, the aggregator 402 dispatches the search queries to the respective external search engines through the external search engine interface 404 using web service or API interfaces provided by the external engines for programmatic access. In some examples, the aggregator 402 manages the search queries asynchronously, allowing multiple external searches to be conducted in parallel to reduce the overall response time.

As external search results 412 are returned from the external search engines, the aggregator 402 collects and aggregates them. This involves parsing the results, which may be in various formats depending on the external engine, and normalizing them into a consistent structure for further processing. In some examples, the aggregator 402 may also deduplicate results that appear in multiple external engines, rank the aggregated results based on relevance to the query and other criteria, and apply additional filtering or categorization.

The aggregator 402 acts as an intermediary between the user and the external search engines, leveraging the specialized capabilities of an external engine to fulfill the search query in a comprehensive and efficient manner. By intelligently coordinating the search across multiple sources, the aggregator 402 enhances the depth and breadth of the search results available to the user, ultimately contributing to a more effective and satisfying search experience.

In some examples, the aggregator 402 uses an internal index search engine 406 to search an internal index maintained by an augmented search engine. This process provides quick and relevant search results from proprietary or curated content that the augmented search engine has access to. For example, upon receiving a search query as processed by other components of the augmented search engine, the aggregator 402 evaluates the query to determine its relevance to the content stored within the internal index. This evaluation is based on the nature of the query, including the topics, keywords, and any specific requirements or preferences indicated by the user.

The aggregator 402 formulates a search request tailored to the internal index search engine. This involves translating the search query into a format or query language that is compatible with the internal index search engine. The aggregator 402 may also specify additional search parameters or options that can influence the search results, such as limiting the search to specified categories of content, specifying the desired number of results, or applying filters based on content attributes like date, authorship, or content type.

Once the search request is prepared, the aggregator 402 submits it to the internal index search engine 406. The internal index search engine 406 then executes the search against the internal index, which contains a structured repository of content that the augmented search engine has collected, organized, and indexed. This content may include documents, articles, multimedia files, and other types of information resources that are relevant to the search engine's domain of expertise or intended user base.

The internal index search engine retrieves the search results that match the query criteria from the internal index. These results are ranked based on their relevance to the search query, taking into account factors such as the presence and frequency of keywords, the recency of the content, and any other relevance signals that the internal index search engine 406 is configured to use.

The aggregator 402 effectively harnesses the capabilities of the internal index search engine 406 to provide rapid access to relevant, proprietary content within the augmented search engine's internal index, enhancing the overall search experience for the user by complementing external search results with pertinent content from the internal index.

The internal search results 414 from the internal index search engine 406 are then returned to the aggregator 402, which collects and integrates these results with any other results obtained from external search engines by the external search engine interface 404 or other sources. The aggregator 402 may perform additional processing on the aggregated results, such as deduplication, re-ranking, or categorization, to prepare a unified set of search results for presentation to the user.

In some examples, the aggregator 402 uses a ranking and filter model 408 to refine the external search results 412 and the internal search results 414 obtained from both internal and external search engines. The ranking and filter model 408 provides that the search results presented to the user are relevant and of high quality.

In some examples, the search results from different sources may be in various formats, the first task of the ranking and filter model 408 is to normalize these results into a consistent structure. This normalization process involves converting the metadata associated with a search result into a standard format that can be processed uniformly.

In some examples, the ranking and filter model 408 applies predefined filtering criteria to remove irrelevant, low-quality, or duplicate results. Filtering criteria can be based on various factors, such as the credibility of the source, the freshness of the content, user preferences, or specific content guidelines defined by an augmented search engine. This provides that pertinent results are considered for ranking.

In some examples, with a filtered set of results, the ranking and filter model 408 ranks search results based on their relevance to an initial query and the search results' overall quality. This ranking process considers a multitude of factors, including the presence and density of query terms within the content, the semantic relationship between the query terms and the content, user engagement metrics for similar queries, the authority and trustworthiness of the content source, and the recency of the content, especially for time-sensitive queries.

In some examples, the ranking and filter model 408 personalizes the search results based on a user's search history, preferences, and behavior. Personalization algorithms adjust the ranking of the results to better match the individual user's interests and past interactions with the search engine.

In reference to FIG. 2B, in some examples, the aggregator 402 stores search results 248 in the search state database 232 for use by other components of the augmented search engine 256.

Referring to FIG. 2A, in operation 220, the router 230 uses a summarizer 236 of the augmented search engine 256 to generate 254 a search summary 252. The router 230 determines whether a search has progressed to the point that one or more search queries 244 have been satisfied. For example, in reference to FIG. 3, a router 302 monitors search state data 312 stored in a search state database using a search state classification model 308 and determines that the augmented search has progressed to the point that the augmented search can enter a terminate search phase and search results can be summarized and presented to a user.

The search state classification model 308 is trained to generate a next search phase 314 indicating a terminate search phase in a process more fully described in reference to FIG. 9A and FIG. 9B. Training data used to train the search state classification model 308 to recognize that an augmented search is ready to enter a terminate search phase includes, but is not limited to:

Completed search sessions: A collection of search session data where the search successfully met the user's information requirements and was concluded without the need for further input or clarification. This data includes the initial query, any user prompts and user responses, the search queries generated, and the search results that led to the termination of the search. Analyzing these completed sessions helps the model learn the characteristics of searches that are ready for termination.

User satisfaction indicators: Feedback from users indicating their satisfaction with the search results, such as ratings, comments, or the absence of further query refinement attempts after receiving the search results. This feedback serves as a direct indicator of the search's success and readiness for termination.

Search outcome annotations: Expert annotations on search sessions, categorizing them based on whether the search should be terminated or continued. These annotations provide a ground truth for the model, helping it to understand the criteria for deciding when a search is complete.

Query-result relevance scores: Data on the relevance of search results to the user's query, including metrics such as click-through rates, time spent on result pages, and relevance ratings. High relevance scores are indicative of successful searches that are candidates for termination.

Search progression data: Information capturing the progression of the search session, including the number of user prompts generated, the number of user responses, and the evolution of the search query over time. This data helps the model recognize patterns in the search progression that typically lead to successful conclusions.

Contextual information: Contextual data related to the search, such as the time of day, the user's search history, and the device used for the search. This information can influence the decision to terminate a search, as certain contexts may be more conducive to concluding the search successfully.

NLP features: NLP features extracted from the search queries and user interactions, such as sentiment analysis, named entity recognition, and syntactic parsing. These features provide insights into the content and intent of the user's queries and responses, aiding the model in assessing the completeness of the search.

In some examples, using a search state classification model 308 to determine the appropriate phase of an augmented search process, such as when to enter a terminate search phase, offers several features that enhance the efficiency and effectiveness of the augmented search engine.

In some examples, the search state classification model 308 provides the feature of improved search efficiency. By accurately determining when a search has gathered sufficient information to meet the user's requirements, the search state classification model 308 prevents unnecessary search iterations. This efficiency saves time for both the user and the augmented search engine, allowing for a quicker resolution of queries.

In some examples, enhanced user satisfaction is another feature offered by the search state classification model 308. Users benefit from receiving timely and relevant search results without the frustration of excessive or irrelevant prompts for additional information. This responsiveness to user requirements can lead to a more positive search experience and increased trust in the augmented search engine.

In some examples, the search state classification model 308 also contributes to resource optimization within the augmented search engine. By streamlining the search process and reducing the need for additional computational resources to process unnecessary search steps, the search state classification model 308 helps in allocating resources more effectively. This optimization can be particularly beneficial in handling large volumes of queries or in resource-constrained environments.

In some examples, the search state classification model 308 enhances the adaptability of the augmented search engine. The search state classification model 308's ability to learn from user interactions and feedback allows it to continuously improve its decision-making regarding search termination. This adaptability ensures that the augmented search engine remains effective even as user behaviors and information landscapes evolve.

In some examples, another feature provided by the search state classification model 308 is the generation of actionable insights. By analyzing search sessions and the criteria for their termination, the search state classification model 308 can identify patterns and trends in user queries and information requirements. These insights can inform further improvements to the augmented search engine, such as refining search algorithms or enhancing user interfaces.

In some examples, the search state classification model 308 also offers the feature of reducing information overload for users. By determining the optimal point to terminate a search, the search state classification model 308 ensures that users are presented with a concise and relevant set of search results. This focus on quality over quantity helps users in making informed decisions more efficiently.

In some examples, the search state classification model 308 contributes to the overall effectiveness of the augmented search engine. By ensuring that searches are concluded when appropriate, the search state classification model 308 supports the delivery of accurate and relevant search results. This effectiveness is crucial for maintaining the utility and reliability of the augmented search engine as a tool for information retrieval.

Referring to FIG. 2A and FIG. 2B, in response to determining that the search has progressed to the point that the search results 248 may be summarized and presented to the user 226 in a terminate search generate search summary phase 214, the router 230 initiates 250 generation 254 of a search summary by a summarizer 236.

Figure 5:
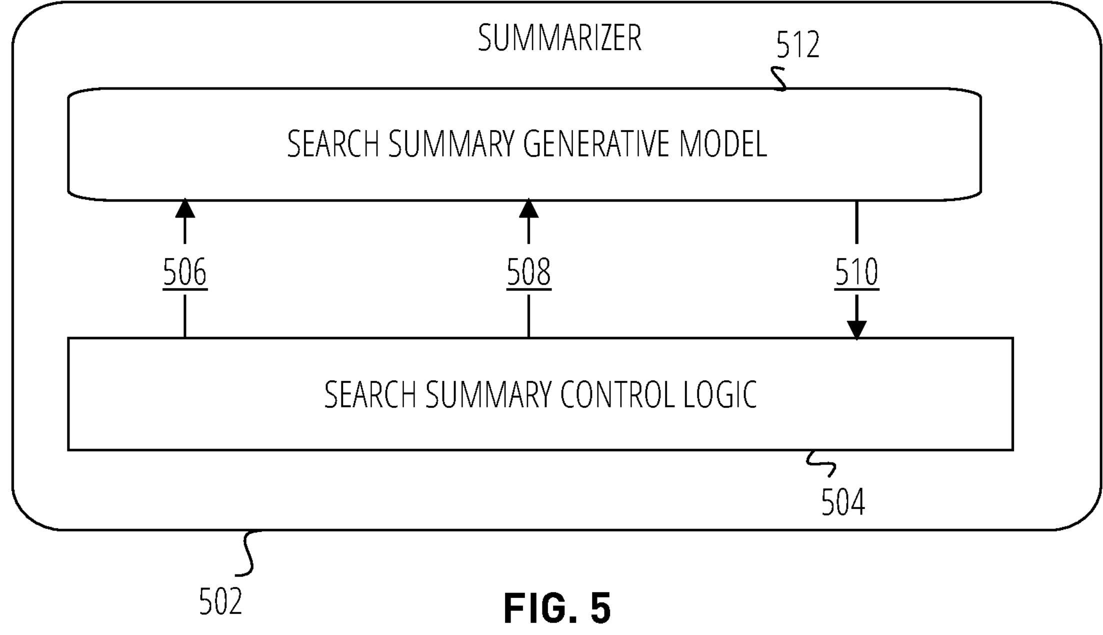
FIG. 5 is an architecture diagram of a summarizer for performing an augmented search, according to some examples.

In response to a request from the router 230, the summarizer 236 retrieves search state data 258 from the search state database 232 and initiates a generation 254 of a search summary 252. For example, referring to FIG. 5, a summarizer 502 includes a search summary generative model 512 and search summary control logic 504 to generate a search summary 252 (of FIG. 2B). The search summary control logic 504 generates a set of instructions 506 that are provided as part of the context of the search summary generative model 512. The instructions 506 include formatting instructions for generating a summary of data of a search state data 508 of a search that has been completed. The search state data 508 is a dataset stored on the search state database 232 (of FIG. 2B) by the various components of an augmented search engine during a search. At the completion of a search, the search state data 508 includes search results generated by an aggregator 234 (of FIG. 2B) and the router 230 (of FIG. 2B). The search state database 232, utilized by both the router 230 and the aggregator 234, stores a variety of data elements used for managing and optimizing the search process. The types of search state data that may be stored include:

Original Initial query: The initial query submitted by the user, serving as the starting point for the search process.

User prompts: Details of any prompts generated by the router 230 to request additional information from the user, if the initial query is deemed ambiguous or insufficiently detailed.

User Input: Any additional information or clarifications provided by the user in response to the user prompts.

- Optimized Search Queries: The refined or reformulated search queries, based on the original initial query and any additional user input, designed to retrieve relevant search results.
- Search Results: The results obtained from querying the internal and external search indexes, including metadata such as source, ranking, and any applied filters.
- User Interactions with Search Results: Data capturing how users interact with the search results, such as clicks, dwell time, and feedback, used for assessing relevance and quality.
- Contextual Information: Data related to the search session, including the device used, location, time of the search, and any other environmental or situational factors.
- State of the Search: Information capturing the sequence of actions taken during the search, changes to search parameters, and the status of the search at various stages.

Training of the search summary generative model 512 is more fully described in reference to FIG. 9A and FIG. 9B. Training data used to train the search summary generative model 512 encompasses a variety of elements designed to enable the model to generate concise, relevant, and informative summaries of search results. This training data includes, but is not limited to:

- Search queries and results: Pairs of search queries and the corresponding search results, including titles, snippets, and URLs. This data helps the model learn how to extract key information relevant to the query from the search results.
- User-generated summaries: Human-written summaries for sets of search results related to specific queries. These summaries serve as examples of how to condense and highlight pertinent information from search results.
- Relevance feedback: Data on which search results users found useful for given queries, including click-through rates and user ratings. This feedback can guide the model in identifying which aspects of search results are pertinent to users.
- Query-result relationships: Annotations describing the relationship between search queries and individual search results, such as relevance scores or categorizations. This helps the model understand the significance of different results in relation to the query.
- Natural language annotations: Semantic annotations of search results and summaries, including named entity recognition, part-of-speech tagging, and sentiment analysis. These annotations aid the model in understanding the linguistic structure and meaning of the text.
- Summarization techniques: Examples of different summarization techniques, such as extractive summarization (selecting key phrases or sentences from the original text) and abstractive summarization (rewriting the essence of the text in new words). Training on a variety of techniques enables the model to adopt an effective approach for summarizing search results.
- Contextual information: Data about the context in which queries are made, such as the user's search history, the time of the query, and the device used. This information can help the model tailor summaries to the user's specific context and preferences.
- Cross-domain content: Search results and summaries from a wide range of domains and topics. Training on diverse content ensures that the model can generate accurate and relevant summaries across different subject areas.

The training data is used to train the search summary generative model 512 to synthesize information from search results into coherent, informative summaries that capture the essence of the results in relation to the user's query. This process enhances the user's search experience by providing quick insights into the content of search results.

In some examples, a search summary generative model is external to an augmented search engine such as, but not limited to, a general purpose LLM hosted by a third party. In such an arrangement, the summarizer 502 uses search summary control logic 504 to compose a summary generation prompt or message using the instructions 506 and the search state data 508. The summary generation prompt is communicated to the external search summary generative model and the search summary 510 is received from the external search summary generative model using an API of the external search summary generative model.

In some examples, using a search summary generative model 512 to generate a summary of search results in an augmented search offers the feature of improved user comprehension. The search summary generative model 512 can synthesize complex and voluminous search results into concise summaries, aiding users in quickly understanding the essence of the search results without needing to sift through each result individually. This facilitates easier and faster comprehension of the search outcomes.

In some examples, the search summary generative model 512 enhances the user experience by providing summaries that capture the pertinent information from a broad set of search results. Users can quickly grasp the relevance of the search results to their query, leading to higher satisfaction with the search process and potentially increasing the likelihood of users returning to the augmented search engine for future information requirements.

In some examples, the search summary generative model 512 contributes to time and resource efficiency. It streamlines the search process by reducing the time users spend analyzing individual search results. This efficiency benefits users and optimizes the use of computational resources within the augmented search engine, as the model automates the summarization process that would otherwise require significant manual effort and processing power.

In some examples, the search summary generative model 512 allows for customization and personalization. It can be trained to generate summaries tailored to specific user preferences or query contexts. By learning from user interactions and feedback, the search summary generative model 512 can adapt its summarization techniques to better align with individual user requirements or preferences, offering a more personalized search experience.

In some examples, the scalability of the search summary generative model 512 ensures that the augmented search engine can effectively serve a broad user base with varying information requirements, from simple queries to complex research topics. This scalability is useful for handling a wide range of queries and generating summaries for diverse sets of search results.

In some examples, the search summary generative model 512 maintains quality control and consistency in the summaries it generates. This ensures that users receive reliable and coherent information regardless of the query, which is useful for building user trust in the augmented search engine's ability to provide valuable and accurate summaries.

In some examples, the search summary generative model 512 is designed to extract and highlight insights, trends, or patterns within the search results, adding value by summarizing the content and by providing users with actionable insights derived from the aggregated search results.

In some examples, the search summary generative model 512 effectively reduces information overload for users by condensing the search results into summaries. This reduction helps users focus on the relevant information, making the search process more manageable and less overwhelming.

Figure 8:
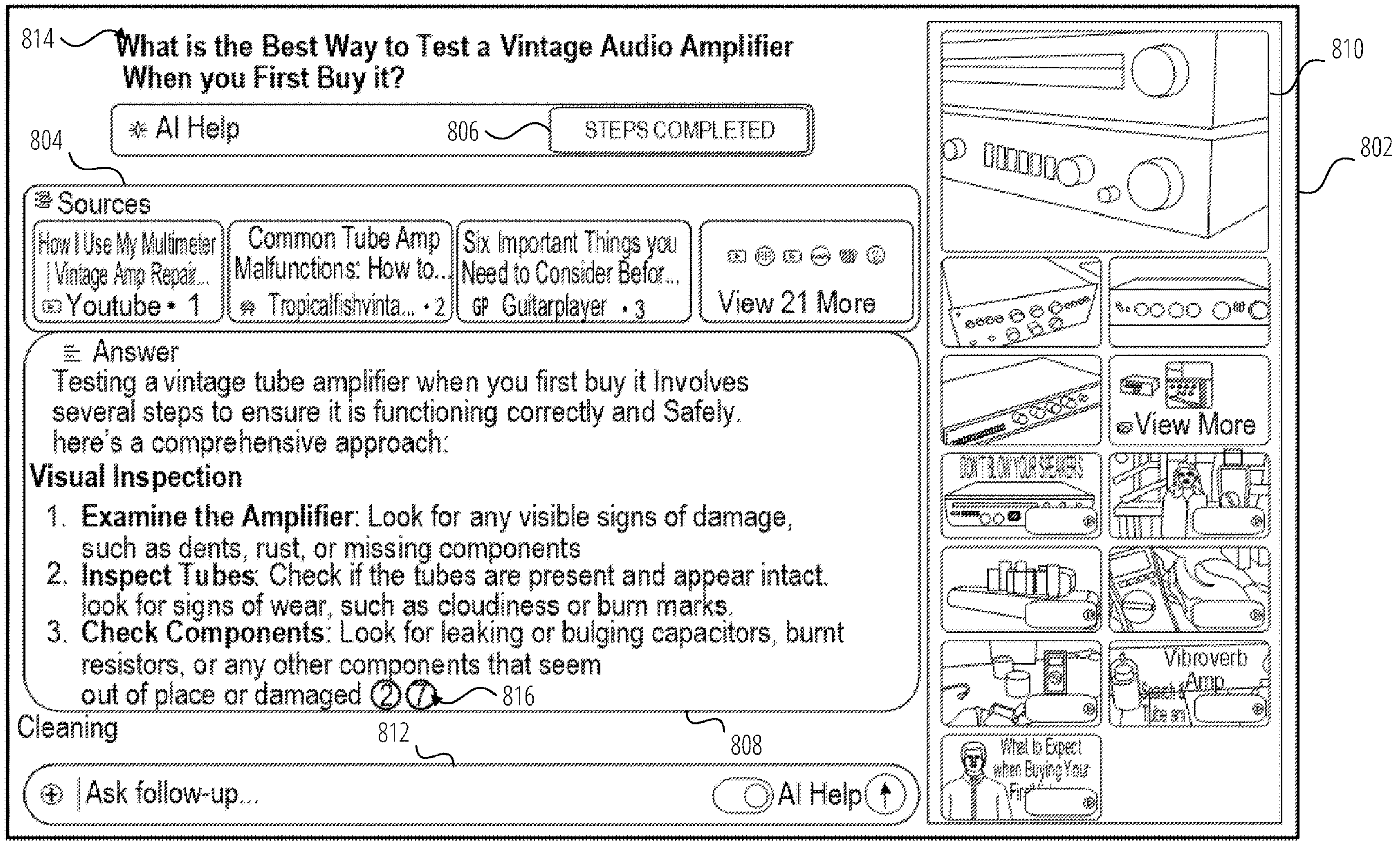
FIG. 8 is an illustration of a summary results screen of a user interface for performing an augmented search, according to some examples.

Referring to FIG. 2A, in operation 222, the augmented search engine 256 displays the search summary 252 to the user using a summary results screen as more fully described in reference to FIG. 8.

Figure 6A:
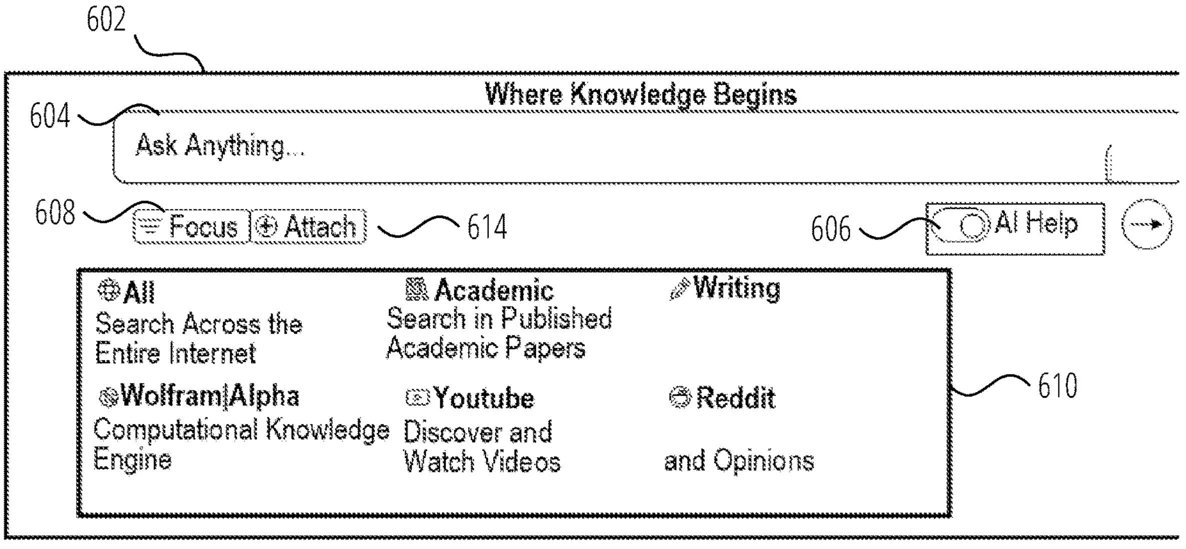
FIG. 6A is an illustration of an initial query input screen portion of a user interface for performing an augmented search, according to some examples.
Figure 6B:
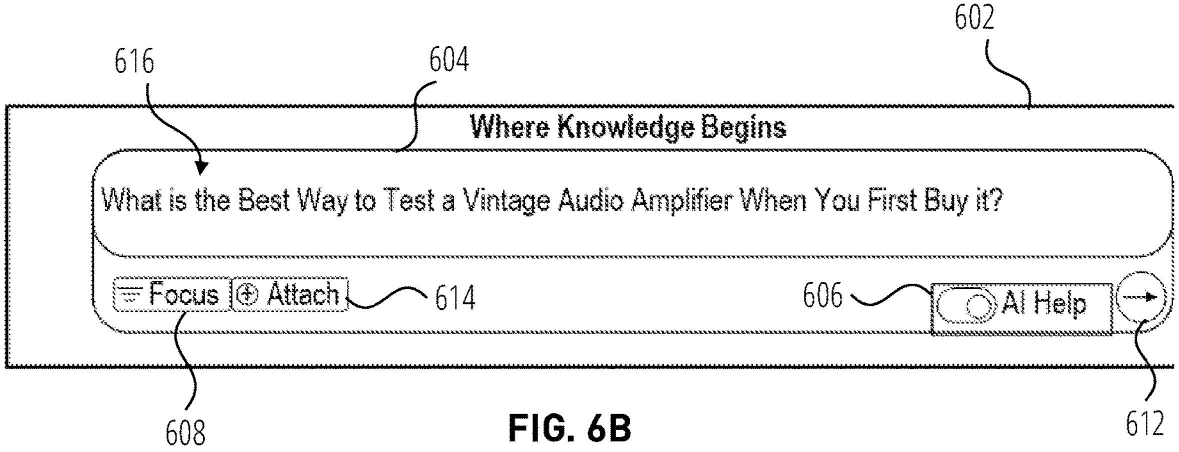
FIG. 6B is an illustration of entry of a search query into a user interface for performing an augmented search, according to some examples.

FIG. 6A is an illustration of an initial query input screen portion of a user interface for performing an augmented search and FIG. 6B illustrates an entry of an initial query, according to some examples. An augmented search engine uses an initial query input screen 602 to request an initial input query from a user.

An initial query input screen 602 includes a query input field 604, an augmentation request selection button 606, a focus selection interface element 608, a focus selection menu 610, an attachment selection interface element 614, and a submit query selection button 612.

The initial query input screen 602 is designed to facilitate the entry of an initial query into the augmented search engine. The query input field 604 allows users to type or paste their search query.

The augmentation request selection button 606 enables users to specify if they want their search to be augmented, potentially by accessing additional data sources or using advanced search algorithms.

The focus selection interface element 608 and the focus selection menu 610 allow users to narrow down the scope of their search by selecting specific areas of interest, topics, or specific locations that a user may want searched.

The attachment selection interface element 614 provides an option for users to attach files or documents that may be relevant to their search query, offering a more context-rich input to the search engine.

A user enters an initial query 616 into the query input field 604 and selects the submit query selection button 612 to submit the initial query 616 to the augmented search engine and initiate an augmented search as described above.

The initial query input screen 602 is the starting point for users interacting with the augmented search engine, designed to capture the information used to initiate a tailored and efficient search process. The layout and features of the initial query input screen are crafted to enhance user experience by offering intuitive and flexible options for query customization.

Figure 7:
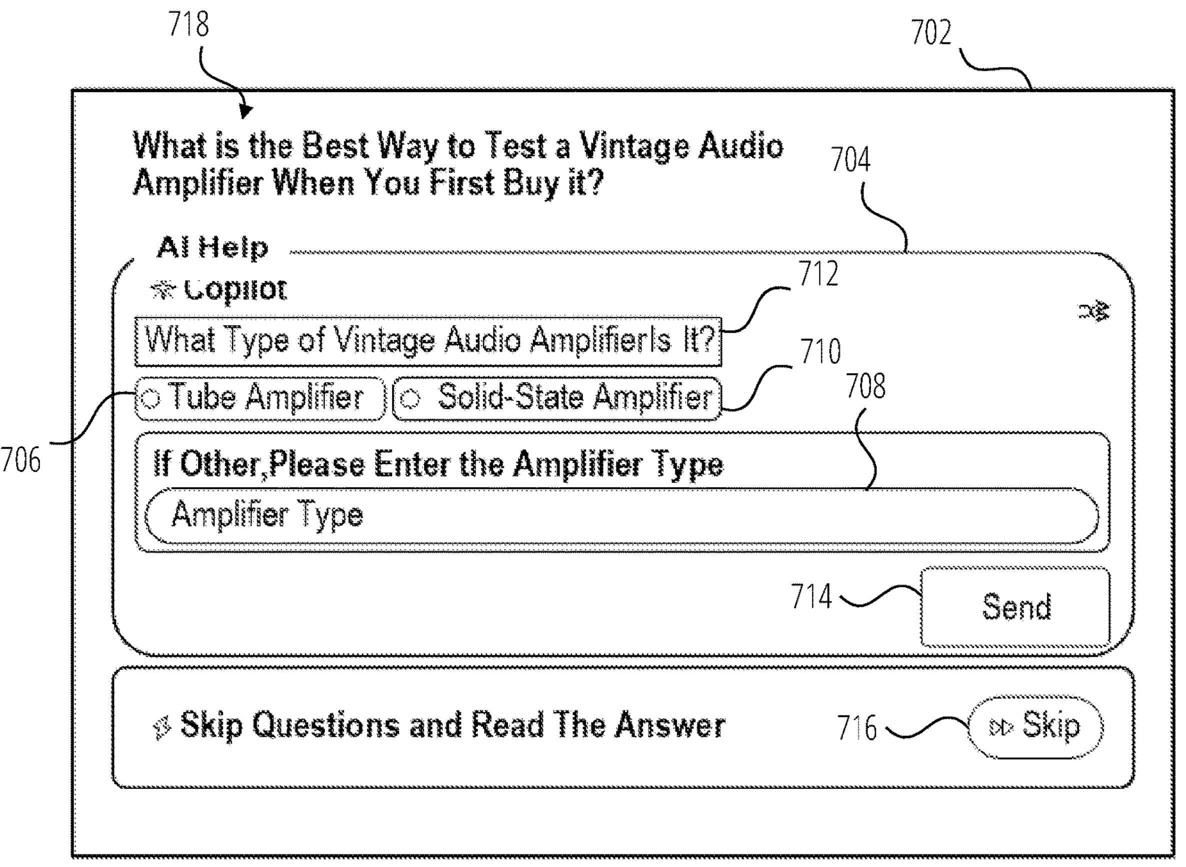
FIG. 7 is an illustration of a search prompt screen portion of a user interface for performing an augmented search, according to some examples.

FIG. 7 is an illustration of a search prompt screen portion of a user interface for performing an augmented search, according to some examples. The user prompt screen 702 is designed to interact with the user following the initial submission of a search query 718 when additional information or clarification is useful to refine the search process. The user prompt screen 702 is a component of an augmented search UI that facilitates a more interactive and precise search experience by soliciting further input from the user.

A user prompt portion 704, displays a query prompt 712 to the user. The query prompt 712 is generated based on the initial search query 718 submitted by the user and is aimed at clarifying or expanding upon the information provided as described herein. The purpose of this query prompt 712 is to gather more detailed input from the user, which can be used to refine the search and produce more relevant results.

The user prompt portion 704 includes input selectors such as, but not limited to, input selector UI element 706 and input selector UI element 710, which are interactive elements that allow users to respond to the query prompt 712. These selectors can take various forms, such as dropdown menus, checkboxes, or radio buttons, providing users with a set of predefined options to choose from in their response. The inclusion of input selectors simplifies the process of responding to the query prompt 712, making it more user-friendly and efficient.

An input field 708 is also present, offering users the flexibility to type in their response to the query prompt 712. The input field 708 is particularly useful when the user's response cannot be adequately captured by the predefined options in the input selectors. It allows for free-form text entry, enabling users to provide detailed and specific information as part of their response.

Additionally, the user prompt screen 702 features a submit selection UI element 714, an interactive element that users can engage with to submit their response to the query prompt 712. Activating this selector sends the user's response back to the augmented search engine, where it is used to further refine the search query 718 and improve the relevance of search results as described herein.

In some examples, the user prompt screen 702 may also include a read intermediate search results selection UI element 716, an option that allows users to view intermediate search results generated from their initial search query 244 before responding to the query prompt 712. This feature can help users make more informed responses by reviewing the current search results and identifying areas where further clarification or refinement is useful.

The user prompt screen 702 is designed to enhance the search process by engaging users in a dialogue to refine their search queries. Through the use of query prompts 712, input selectors, and input fields 708, the user prompt screen 702 facilitates the collection of additional user input, enabling an augmented search engine to produce more accurate and relevant search results.

FIG. 8 is an illustration of a summary results screen of a user interface for performing an augmented search, according to some examples. An augmented search engine uses a summary results screen 802 to present the final search results to the user after the augmented search engine has processed an initial query 814, including any additional input or clarifications provided by the user in response to user prompts. The summary results screen 802 is designed to effectively communicate the outcomes of an augmented search to a user. Through the integration of a search summary 808, references menu 804, progress selection UI element 806, reference images 810, and an additional user input field 812, the summary results screen 802 provides users are with a comprehensive, understandable, and actionable presentation of search results, facilitating an informative and interactive search experience.

The search summary 808 provides a synthesized overview of the search results based on the initial query 814 and subsequent user interactions with the augmented search engine. The search summary 808 is crafted to highlight relevant information, findings, or answers in response to the initial query 814, offering users a quick and accessible understanding of the search results without the need to sift through individual search hits. In some examples, the search summary 808 includes selectable one or more inline links 816 to references supplied in the references menu 804.

The summary results screen 802 also includes a references menu 804, which includes links or citations to the sources of information presented in the search summary 808. The references menu 804 allows users to explore the original sources found during an augmented search for further details or verification, enhancing the transparency and credibility of the search results.

In some examples, a progress selection UI element 806 is included, offering users the option to view the steps or stages involved in generating the search results. This feature provides insight into the search process, including how the initial query 814 was interpreted and refined, and how the final search results were derived, fostering a deeper understanding of the search mechanism.

In some examples, the summary results screen 802 includes reference images 810, visual elements that complement the search summary 808 by providing graphical representations, illustrations, or relevant images. These images can help users better grasp the information presented in the summary, making the search results more engaging and easier to comprehend.

In some examples, an additional user input field 812 is also present, allowing users to provide feedback, ask follow-up questions, or initiate a new search based on the information presented in the search summary 808. This field supports ongoing interaction with the augmented search engine, enabling users to further refine their search or explore related topics based on the results obtained.

Machine-Learning Pipeline

FIG. 9B is a flowchart depicting a machine-learning pipeline 916, according to some examples. The machine-learning pipeline 916 may be used to generate a trained machine-learning model 918 (e.g., a search state classification model 308 (of FIG. 3), a user prompt generative model 304 (of FIG. 3), a search query generative model 306 (of FIG. 3), a search summary generative model 512 (of FIG. 5), and the like) to perform operations associated with searches and query responses.

Machine learning may involve using computer algorithms to automatically learn patterns and relationships in data, potentially without the need for explicit programming. Machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Generating a trained machine-learning model 918 may include multiple phases that form part of the machine-learning pipeline 916, including for example the following phases illustrated in FIG. 9A:

- Data collection and preprocessing 902: This phase may include acquiring and cleaning data to ensure that it is suitable for use in the machine learning model. This phase may also include removing duplicates, handling missing values, and converting data into a suitable format.
- Feature engineering 904: This phase may include selecting and transforming the training data 922 to create features that are useful for predicting the target variable. Feature engineering may include (1) receiving features 924 (e.g., as structured or labeled data in supervised learning) and/or (2) identifying features 924 (e.g., unstructured or unlabeled data for unsupervised learning) in training data 922.
- Model selection and training 906: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 908: This phase may include evaluating the performance of a trained model (e.g., the trained machine-learning model 918) on a separate testing dataset. This phase can help determine if the model is overfitting or underfitting and determine whether the model is suitable for deployment.

Prediction 910: This phase involves using a trained model (e.g., trained machine-learning model 918) to generate predictions on new, unseen data.

Validation, refinement or retraining 912: This phase may include updating a model based on feedback generated from the prediction phase, such as new data or user feedback.

Deployment 914: This phase may include integrating the trained model (e.g., the trained machine-learning model 918) into a more extensive system or application, such as a web service, mobile app, or IoT device. This phase can involve setting up APIs, building a user interface, and ensuring that the model is scalable and can handle large volumes of data.

FIG. 9B illustrates further details of two example phases, namely a training phase 920 (e.g., part of the model selection and trainings 906) and a prediction phase 926 (part of prediction 910). Prior to the training phase 920, feature engineering 904 is used to identify features 924. This may include identifying informative, discriminating, and independent features for effectively operating the trained machine-learning model 918 in pattern recognition, classification, and regression. In some examples, the training data 922 includes labeled data, known for pre-identified features 924 and one or more outcomes. Any of the features 924 may be a variable or attribute, such as an individual measurable property of a process, article, system, or phenomenon represented by a data set (e.g., the training data 922). Features 924 may also be of different types, such as numeric features, strings, and graphs, and may include one or more of content 928, concepts 930, attributes 932, historical data 934, and/or user data 936, merely for example.

In training phase 920, the machine-learning pipeline 916 uses the training data 922 to find correlations among the features 924 that affect a predicted outcome or prediction/inference data 938.

With the training data 922 and the identified features 924, the trained machine-learning model 918 is trained during the training phase 920 during machine-learning program training 940. The machine-learning program training 940 appraises values of the features 924 as they correlate to the training data 922. The result of the training is the trained machine-learning model 918 (e.g., a trained or learned model).

Further, the training phase 920 may involve machine learning, in which the training data 922 is structured (e.g., labeled during preprocessing operations). The trained machine-learning model 918 implements a neural network 942 capable of performing, for example, classification and clustering operations. In other examples, the training phase 920 may involve deep learning, in which the training data 922 is unstructured, and the trained machine-learning model 918 implements a deep neural network 942 that can perform both feature extraction and classification/clustering operations.

In some examples, a neural network 942 may be generated during the training phase 920, and implemented within the trained machine-learning model 918. The neural network 942 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 942 operationally computes a function, such as an activation function, which takes as input the weighted sum of the outputs of the neurons in the previous layer, as well as a bias term. The output of this function is then passed as input to the neurons in the next layer. If the output of the activation function exceeds a specified threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 942 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 920, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 926, the trained machine-learning model 918 uses the features 924 for analyzing query data 944 to generate inferences, outcomes, or predictions, as examples of a prediction/inference data 938. For example, during prediction phase 926, the trained machine-learning model 918 generates an output. Query data 944 is provided as an input to the trained machine-learning model 918, and the trained machine-learning model 918 generates the prediction/inference data 938 as output, responsive to receipt of the query data 944.

In some examples, the trained machine-learning model 918 may be a generative AI model. Generative AI is a term that may refer to any type of artificial intelligence that can create new content from training data 922. For example, generative AI can produce text, images, video, audio, code, or synthetic data similar to the original data but not identical.

Some of the techniques that may be used in generative AI are:

- Convolutional Neural Networks (CNNs): CNNs may be used for image recognition and computer vision tasks. CNNs may, for example, be designed to extract features from images by using filters or kernels that scan the input image and highlight important patterns.
- Recurrent Neural Networks (RNNs): RNNs may be used for processing sequential data, such as speech, text, and time series data, for example. RNNs employ feedback loops that allow them to capture temporal dependencies and remember past inputs.
- Generative adversarial networks (GANs): GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.
- Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.
- Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the query data 944 may include text, audio, image, video, numeric, or media content prompts and the output prediction/inference data 938 includes text, images, video, audio, code, or synthetic data.

Figure 10:
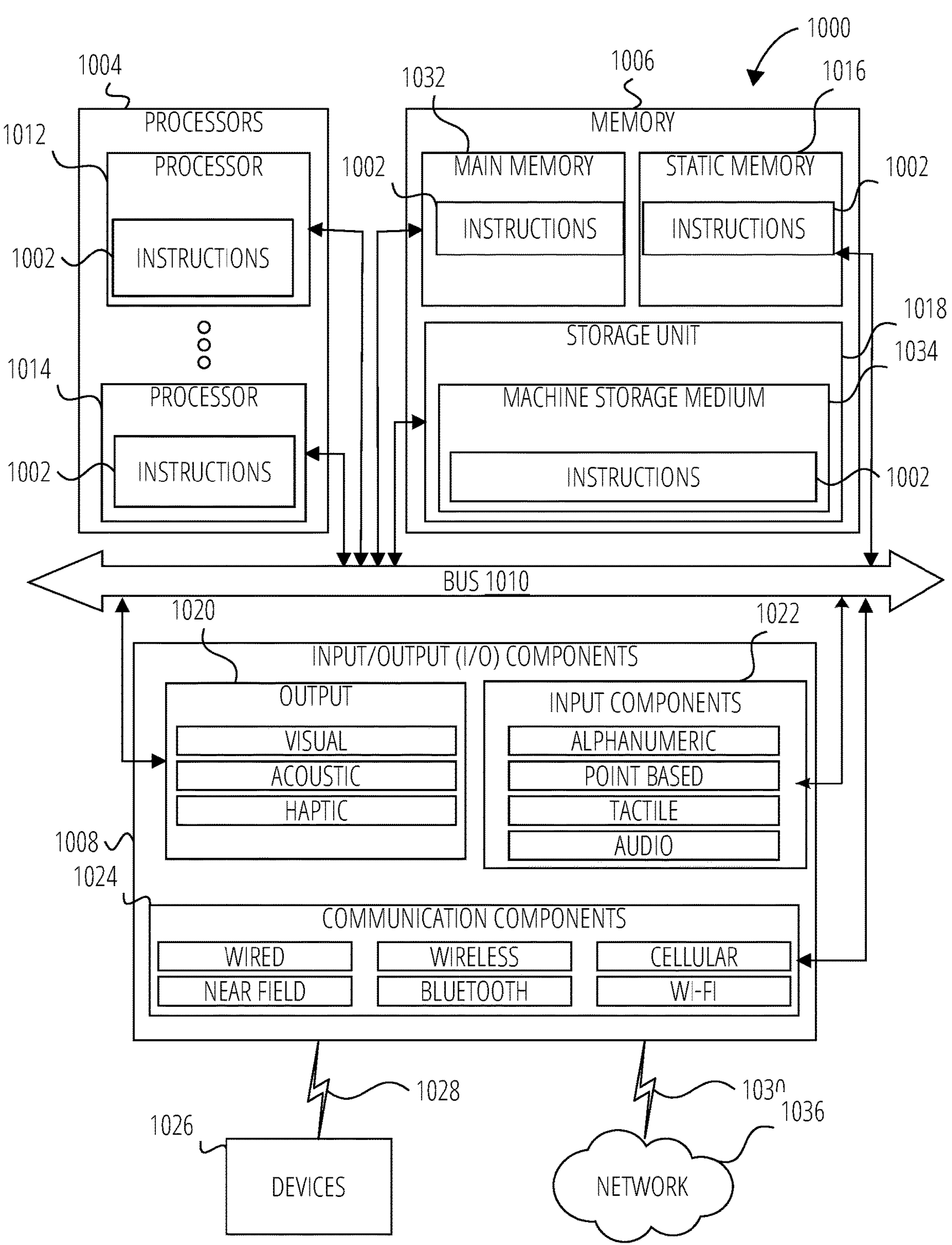
FIG. 10 illustrates a diagrammatic representation of a machine in the form of a computer system within which a set of instructions may be executed for causing the machine to perform any one or more of the methodologies discussed herein, according to some examples.

FIG. 10 illustrates a diagrammatic representation of a machine 1000 in the form of a computing system within which a set of instructions may be executed for causing the machine 1000 to perform any one or more of the methodologies discussed herein, according to examples. Specifically, FIG. 10 shows a diagrammatic representation of the machine 1000 in the example form of a computer system, within which instructions 1002 (e.g., software, a program, an application, an applet, an application, or other executable code) for causing the machine 1000 to perform any one or more of the methodologies discussed herein may be executed. For example, the instructions 1002 may cause the machine 1000 to execute any one or more operations of any one or more of the methods described herein. In this way, the instructions 1002 transform a general, non-programmed machine into a particular machine 1000 (e.g. a host for an augmented search engine, a host for a client, a host for a search engine, or a host for a generative model) that is specially configured to carry out any one of the described and illustrated functions in the manner described herein.

In alternative examples, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein.

The machine 1000 includes hardware processors 1004, memory 1006, and I/O components 1008 configured to communicate with each other such as via a bus 1010. In some examples, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 1012 and a processor 1014 that may execute the instructions 1002. The term "processor" is intended to include multi-core processors that may comprise two or more independent processors (sometimes referred to as "cores") that may execute instructions 1002 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory 1006 may include a main memory 1032, a static memory 1016, and a storage unit 1018 including a machine storage medium 1034, accessible to the processors 1004 such as via the bus 1010. The main memory 1032, the static memory 1016, and the storage unit 1018 store the instructions 1002 embodying any one or more of the methodologies or functions described herein. The instructions 1002 may also reside, completely or partially, within the main memory 1032, within the static memory 1016, within the storage unit 1018, within at least one of the processors 1004 (e.g., within the processor's cache memory), or any suitable combination thereof, during execution thereof by the machine 1000.

The input/output (I/O) components 1008 include components to receive input, provide output, produce output, transmit information, exchange information, capture measurements, and so on. The specific I/O components 1008 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various examples, the I/O components 1008 may include output components 1020 and input components 1022. The output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1008 may include communication components 1024 operable to couple the machine 1000 to a network 1036 or devices 1026 via a coupling 1030 and a coupling 1028, respectively. For example, the communication components 1024 may include a network interface component or another suitable device to interface with the network 1036. In further examples, the communication components 1024 may include wired communication components, wireless communication components, cellular communication components, and other communication components to provide communication via other modalities. The devices 1026 may be another machine or any of a wide variety of peripheral devices (e.g., a peripheral device coupled via a universal serial bus (USB)). For example, as noted above, the machine 1000 may correspond to any one of a host for an augmented search engine, a client of an augmented search engine, and the like.

The various memories (e.g., 1006, 1016, 1032, and/or memory of the processor(s) 1004 and/or the storage unit 1018) may store one or more sets of instructions 1002 and data structures (e.g., software) embodying or utilized by any one or more of the methodologies or functions described herein. These instructions 1002, when executed by the processor(s) 1004, cause various operations to implement the disclosed examples.

Described implementations of the subject matter can include one or more features, alone or in combination as illustrated below by way of example:

Example 1 is a machine-implemented method, comprising: receiving, from a user, an initial query for a search; storing the initial query in a search state database; determining a next search phase using the search state database; and in response to determining the next search phase is a search phase of requesting additional user input, performing operations comprising: generating a user prompt for the user using the initial query; storing the user prompt in the search state database; displaying the user prompt to the user; and receiving, from the user, the user input in response to the user prompt.

In Example 2, the subject matter of Example 1 includes, wherein determining a next search phase further comprises using a search state classification model.

In Example 3, the subject matter of any of Examples 1-2 includes, wherein generating the user prompt further comprises using a Large Language Model (LLM).

In Example 4, the subject matter of any of Examples 1-3 includes, in response to determining the next search phase is a search phase of searching one or more search indexes, performing operations comprising: generating one or more search queries using the search state database; storing the one or more search queries in the search state database; determining search results by querying one or more search engines using the one or more search queries; and storing the search results in the search state database.

In Example 5, the subject matter of any of Examples 1-4 includes, wherein generating the one more search queries further comprises using an LLM.

In Example 6, the subject matter of any of Examples 1-5 includes, in response to determining the next search phase is a search phase of generating a search summary, performing operations comprising: generating a search summary using the search state database; and displaying the search summary to the user.

In Example 7, the subject matter of any of Examples 1-6 includes, wherein generating the search summary further comprises using an LLM.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

Example 11 is a method to implement any of Examples 1-7.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 1036 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1036 or a portion of the network 1036 may include a wireless or cellular network, and the coupling 1030 may be a Code Division Multiple Access (CDMA) connection, a Global System for Mobile communications (GSM) connection, or another type of cellular or wireless coupling. In this example, the coupling 1030 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1002 may be transmitted or received over the network 1036 using a transmission medium via a network interface device (e.g., a network interface component included in the communication components 1024) and utilizing any one of a number of well-known transfer protocols (e.g., hypertext transfer protocol (HTTP)). Similarly, the instructions 1002 may be transmitted or received using a transmission medium via the coupling 1028 (e.g., a peer-to-peer coupling) to the devices 1026. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1002 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of the operations may be distributed among the one or more processors, residing within a single machine or deployed across a number of machines. In some examples, the processor or processors may be located in a single location (e.g., within a home environment, an office environment, or a server farm), while in other examples the processors may be distributed across a number of locations.

Described implementations of the subject matter can include one or more features, alone or in combination as illustrated below by way of example.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A machine-implemented method, comprising:
- receiving, from a user, an initial query for a search;
- storing the initial query in a search state database;
- determining a next search phase using a search state classification model trained using training data comprising annotated initial queries to determine the next search phase based at least in part on the initial query stored in the search state database; and
- in response to determining the next search phase is a search phase of requesting additional user input, performing operations comprising:
  - generating a user prompt for the user using the initial query;
  - storing the user prompt in the search state database;
  - displaying the user prompt to the user; and
  - receiving, from the user, the user input in response to the user prompt.

2. The machine-implemented method of claim 1, wherein generating the user prompt further comprises using a Large Language Model (LLM).

3. The machine-implemented method of claim 1, further comprising:
- in response to determining the next search phase is a search phase of searching one or more search indexes, performing operations comprising:
- generating one or more search queries using the search state database;
- storing the one or more search queries in the search state database;
- determining search results by querying one or more search engines using the one or more search queries; and storing the search results in the search state database.

4. The machine-implemented method of claim 3, wherein generating the one or more search queries further comprises using an LLM.

5. The machine-implemented method of claim 3, further comprising:

in response to determining the next search phase is a search phase of generating a search summary, performing operations comprising:

generating a search summary using the search state database; and displaying the search summary to the user.

6. The machine-implemented method of claim 5, wherein generating the search summary further comprises using an LLM.

7. A computing system comprising:

at least one processor; and at least one memory storing instructions that, when executed by the at least one processor, cause the at least one processor to perform operations comprising:

receiving, from a user, an initial query for a search;

storing the initial query in a search state database;

determining a next search phase using a search state classification model trained using training data comprising annotated initial queries to determine the next search phase based at least in part on the initial query stored in the search state database; and in response to determining the next search phase is a search phase of requesting additional user input, performing operations comprising:

generating a user prompt for the user using the initial query;

storing the user prompt in the search state database;

displaying the user prompt to the user; and receiving, from the user, the user input in response to the user prompt.

8. The computing system of claim 7, wherein generating the user prompt further comprises using a Large Language Model (LLM).

9. The computing system of claim 7, wherein the operations further comprise:

in response to determining the next search phase is a search phase of searching one or more search indexes, performing operations comprising:

generating one or more search queries using the search state database;

storing the one or more search queries in the search state database;

determining search results by querying one or more search engines using the one or more search queries; and storing the search results in the search state database.

10. The computing system of claim 9, wherein generating the one or more search queries further comprises using an LLM.

11. The computing system of claim 9, wherein the operations further comprise:

in response to determining the next search phase is a search phase of generating a search summary, performing operations comprising:

generating a search summary using the search state database; and displaying the search summary to the user.

12. The computing system of claim 11, wherein generating the search summary further comprises using an LLM.

13. A machine-storage medium storing instructions that, when executed by at least one processor, cause the at least one processor to perform operations comprising:

receiving, from a user, an initial query for a search;

storing the initial query in a search state database;

determining a next search phase using a search state classification model trained using training data comprising annotated initial queries to determine the next search phase based at least in part on the initial query stored in the search state database; and in response to determining the next search phase is a search phase of requesting additional user input, performing operations comprising:

generating a user prompt for the user using the initial query;

storing the user prompt in the search state database;

displaying the user prompt to the user; and receiving, from the user, the user input in response to the user prompt.

14. The machine-storage medium of claim 13, wherein generating the user prompt further comprises using a Large Language Model (LLM).

15. The machine-storage medium of claim 13, wherein the operations further comprise:

in response to determining the next search phase is a search phase of searching one or more search indexes, performing operations comprising:

generating one or more search queries using the search state database;

storing the one or more search queries in the search state database;

determining search results by querying one or more search engines using the one or more search queries; and storing the search results in the search state database.

16. The machine-storage medium of claim 15, wherein generating the one or more search queries further comprises using an LLM.

17. The machine-storage medium of claim 15, wherein the operations further comprise:

in response to determining the next search phase is a search phase of generating a search summary, performing operations comprising:

generating a search summary using the search state database; and displaying the search summary to the user.

* * * * *